United States Patent [19]
Miura

[11] Patent Number: 6,103,165
[45] Date of Patent: *Aug. 15, 2000

[54] MOLDING PROCESSES AND APPARATUS AND A MOLDED PRODUCT

[75] Inventor: Kazunori Miura, Shizuoka, Japan

[73] Assignee: Kabushiki Kaisha Bandai, Japan

[*] Notice: This patent is subject to a terminal disclaimer.

[21] Appl. No.: 08/841,410

[22] Filed: Apr. 22, 1997

[30] Foreign Application Priority Data

Apr. 26, 1996 [JP] Japan .................................. 8-131129

[51] Int. Cl.⁷ .............................. B28B 7/16; B29C 45/16
[52] U.S. Cl. ........................ 264/250; 264/255; 264/273; 264/274; 264/275; 264/279; 425/125
[58] Field of Search ................................... 264/250, 255, 264/275, 279, 273, 274; 425/125

[56] References Cited

U.S. PATENT DOCUMENTS

| | | | |
|---|---|---|---|
| 3,354,249 | 11/1967 | Morin | 264/161 |
| 5,464,578 | 11/1995 | Salter et al. | 264/250 |
| 5,527,502 | 6/1996 | Kiuchi et al. | |
| 5,756,029 | 5/1998 | Nakamichi et al. | 264/161 |

FOREIGN PATENT DOCUMENTS 51-47397  4/1976  Japan .
62-40621  10/1987  Japan .

*Primary Examiner*—Jan H. Silbaugh
*Assistant Examiner*—Suzanne E. McDowell
*Attorney, Agent, or Firm*—Graham & James LLP

[57] ABSTRACT

To provide a molding apparatus and a molding process which enable a primary product molded in a primary mold to be held in a secondary mold stably, so that the primary product may not be displaced by a synthetic resin material injected into the secondary mold. If a synthetic resin material is injected into a primary mold cavity 173 in a primary mold 85 into which molding protrusions 187 project, there is molded a primary product 340 having engaging holes 191 formed on its surface. Protrusions 227 projecting into a secondary mold cavity 225 in a secondary mold 87 are engaged in the engaging holes 191 of the primary product 340 to secure it in the secondary mold cavity 225, and a synthetic resin material is injected into the secondary mold cavity 225 to mold a secondary product 361 having through holes made by the engaging protrusions 227 formed on its surface through which the engaging protrusions 227 are removable.

1 Claim, 34 Drawing Sheets

MOLDING PROCESSES AND APPARATUS AND A MOLDED PRODUCT

BACKGROUND OF THE INVENTION

1. Field of the Invention

This invention relates to a molding apparatus in which a primary product molded in a primary mold is inserted for molding in a secondary mold, a molding process and a molded product made by such a process.

2. Description of the related art

Japanese Utility Model Publication No. Sho 62-40621 discloses prior art relating to a molding apparatus in which a primary product molded in a primary mold is inserted for molding in a secondary mold, a molding process and a molded product made by such a process. The molding apparatus described therein has a secondary mold having a cavity in which a primary product molded in a primary mold is placed, and a synthetic resin material is injected to mold a secondary product.

When the synthetic resin material is injected into the secondary mold cavity, its viscosity causes the displacement of the primary product from its proper position. The primary product is, therefore, molded with spacer protrusions for holding it against displacement in the direction of its thickness. The primary product also has a longitudinal end or ends held between a pair of mold portions for holding it against any longitudinal displacement.

The secondary mold of the conventional molding apparatus or molding process, however, has no means for securing in position the primary product molded in the primary mold in position. Therefore, the primary product is molded with spacer protrusions forming integral parts thereof and adapted to engage the wall of the secondary mold cavity. It has, however, no spacer protrusion extending across its thickness, or at right angles to the protrusions mentioned above. When the synthetic resin material is injected into the secondary mold cavity, therefore, its viscosity causes the primary product to be displaced from its proper position and fail to stay as a properly positioned insert.

As one or both ends of the primary product project from one or both longitudinal ends of the secondary product molded by the prior molding apparatus and process, it is necessary to remove its projecting portion or portions. This is, however, a burdensome job which has to be done so carefully as not to damage any other portion of the product.

SUMMARY OF THE INVENTION

This invention is made in view of the above problems, and it is an object of this invention to provide a molding apparatus and a molding process which enable a primary product molded in a primary mold to be held in a secondary mold stably, so that the primary product may not be displaced by any synthetic resin material injected into the secondary mold, and so that the primary product may not have any portion projecting from the secondary product.

In order to solve the above problems and attain the above object, the molding apparatus according to this invention comprises:

(a) a primary mold and a secondary mold;
(b) the primary mold comprising a first mold portion having a first mold recess and a second mold portion having a second mold recess, the first and second mold recesses defining a primary mold cavity when the first and second mold portions are joined together;
(c) the first and second mold portions having protrusions projecting into the primary mold cavity to form holes on the surface of a primary product molded in the primary mold cavity;
(d) the secondary mold comprising a third mold portion having a third mold recess and a fourth mold portion having a fourth mold recess, the third and fourth mold recesses defining a secondary mold cavity when the third and fourth mold portions are joined together;
(e) the third and fourth mold portions having protrusions projecting into the secondary mold cavity to engage the holes of the primary product in the secondary mold cavity to hold it in position.

In order to solve the above problems and attain the above object, the molding process according to this invention comprises:

(a) a first molding step for injecting a synthetic resin material into a primary mold cavity in a primary mold into which molding protrusions project, whereby a primary product having engaging holes formed on its surface is molded; and
(b) a second molding step for molding a secondary product having through holes on its surface made by the protrusions by engaging protrusions inwardly projecting in a secondary mold cavity of a secondary mold into said holes of said primary product molded in said first step for securing said primary product in said secondary mold cavity before injecting a synthetic resin material into a secondary mold cavity.

The molded product according to this invention is molded by the molding apparatus and process as defined above, and comprises:

(a) a primary product defining the interior and a secondary product defining the exterior;
(b) the primary product being molded from a synthetic resin material injected into a primary mold cavity in a primary mold into which molding protrusions project to form engaging holes on the surface of the primary product;
(c) the secondary product being molded to form through holes on its surface made by the protrusions by engaging the protrusions inwardly projecting in said secondary mold cavity of said secondary mold into said holes of said primary product molded in said first step for securing said primary product in said secondary mold cavity before injecting a synthetic resin material into a secondary mold cavity.

DETAILED DESCRIPTION OF THE PREFERRED EMBODIMENTS

Figure 30:
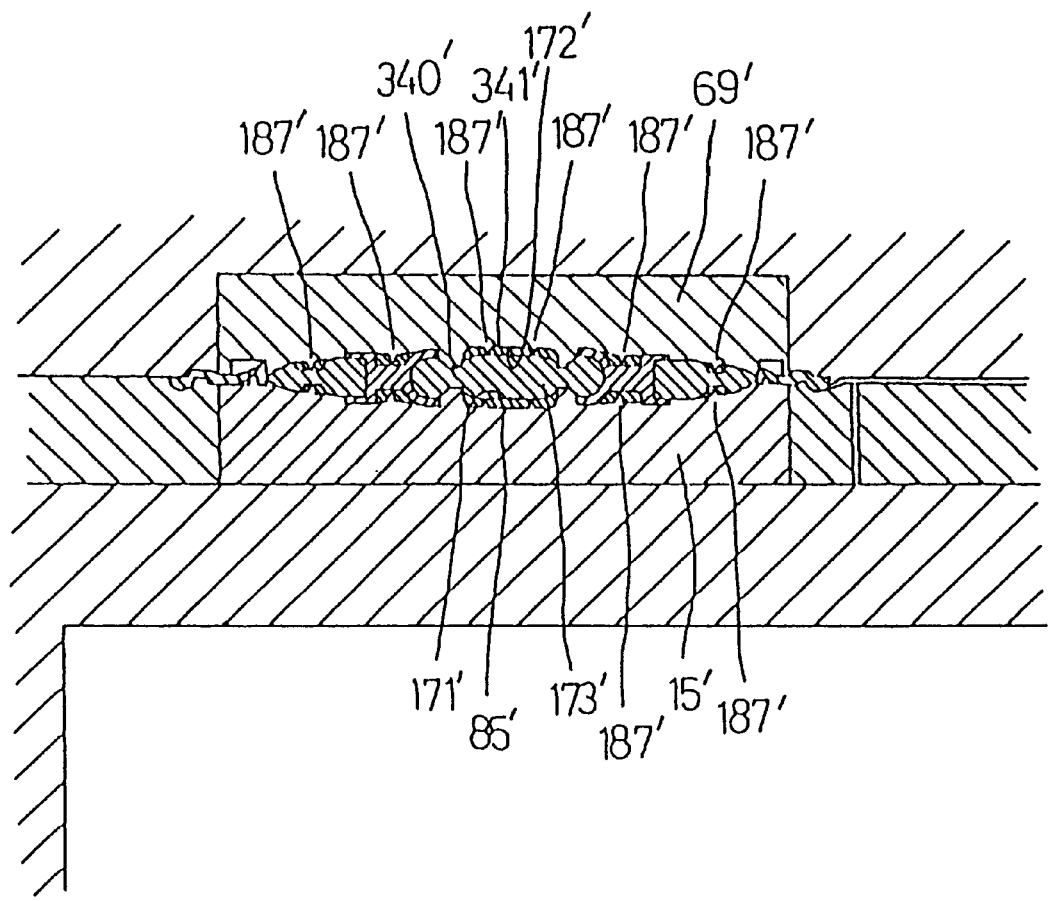
FIG. 30 is a sectional view of part of the primary mold.
Figure 31:
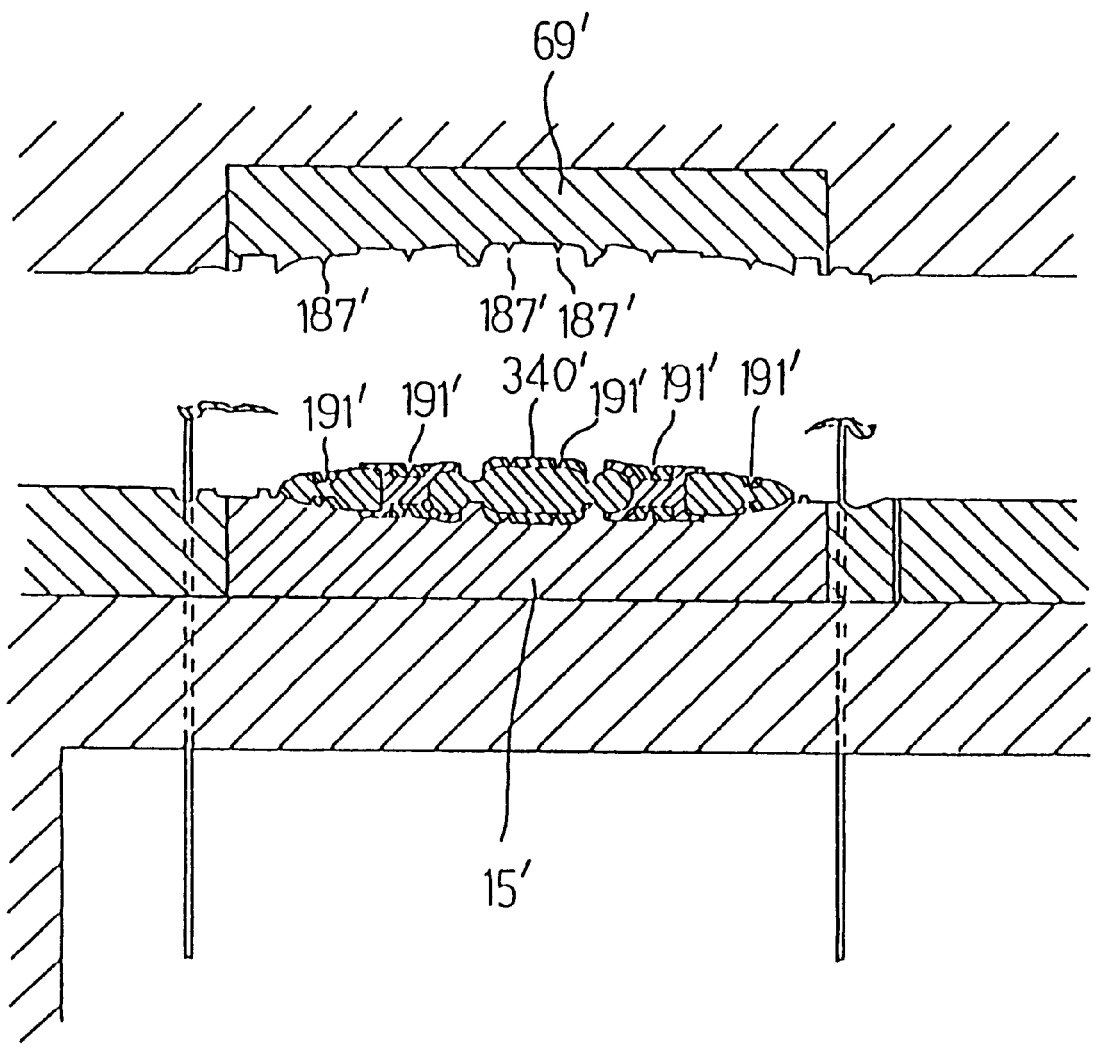
FIG. 31 is a sectional view of part of the primary mold explaining its movement.
Figure 32:
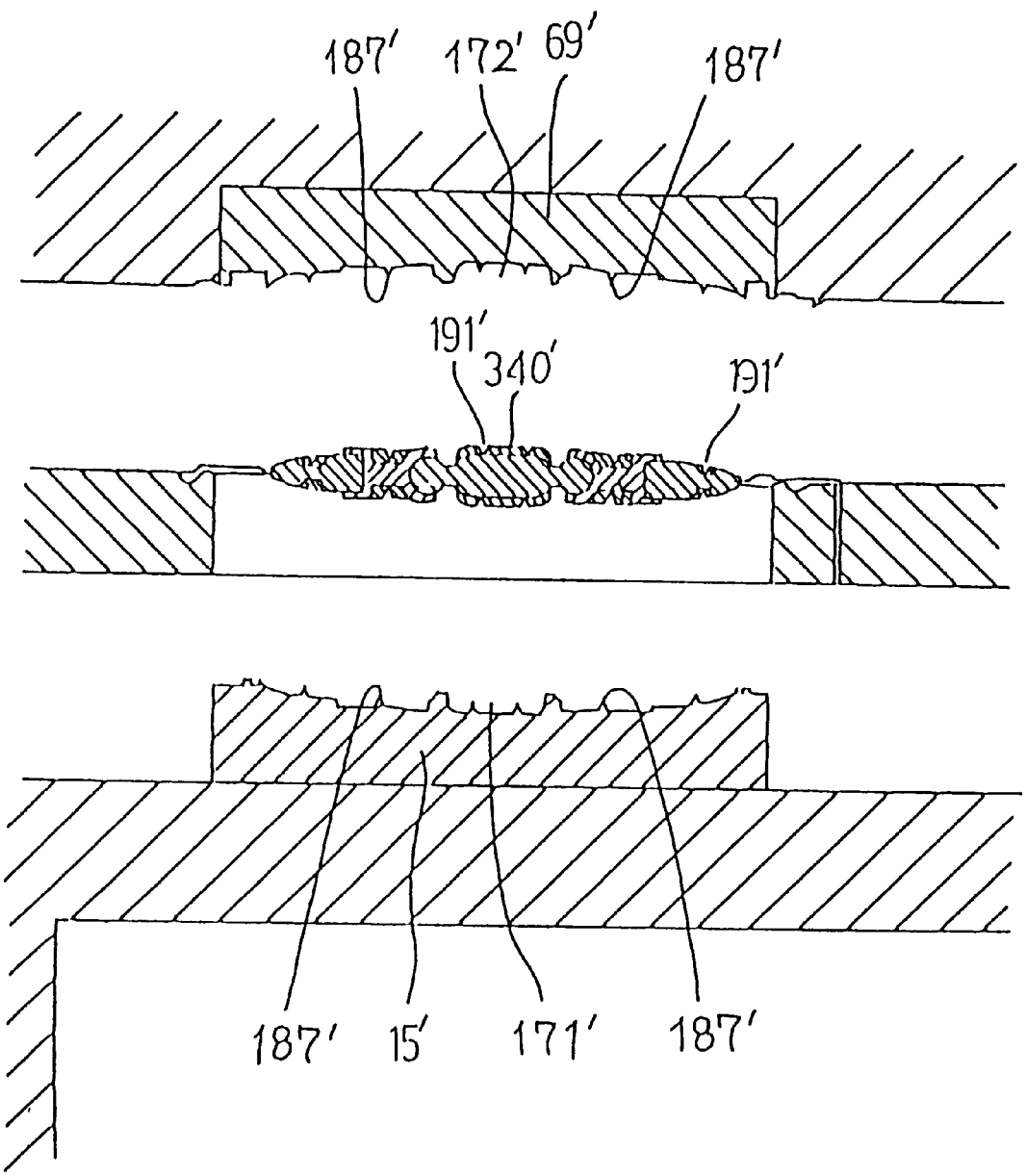
FIG. 32 is a sectional view of part of the primary mold explaining its movement.
Figure 33:
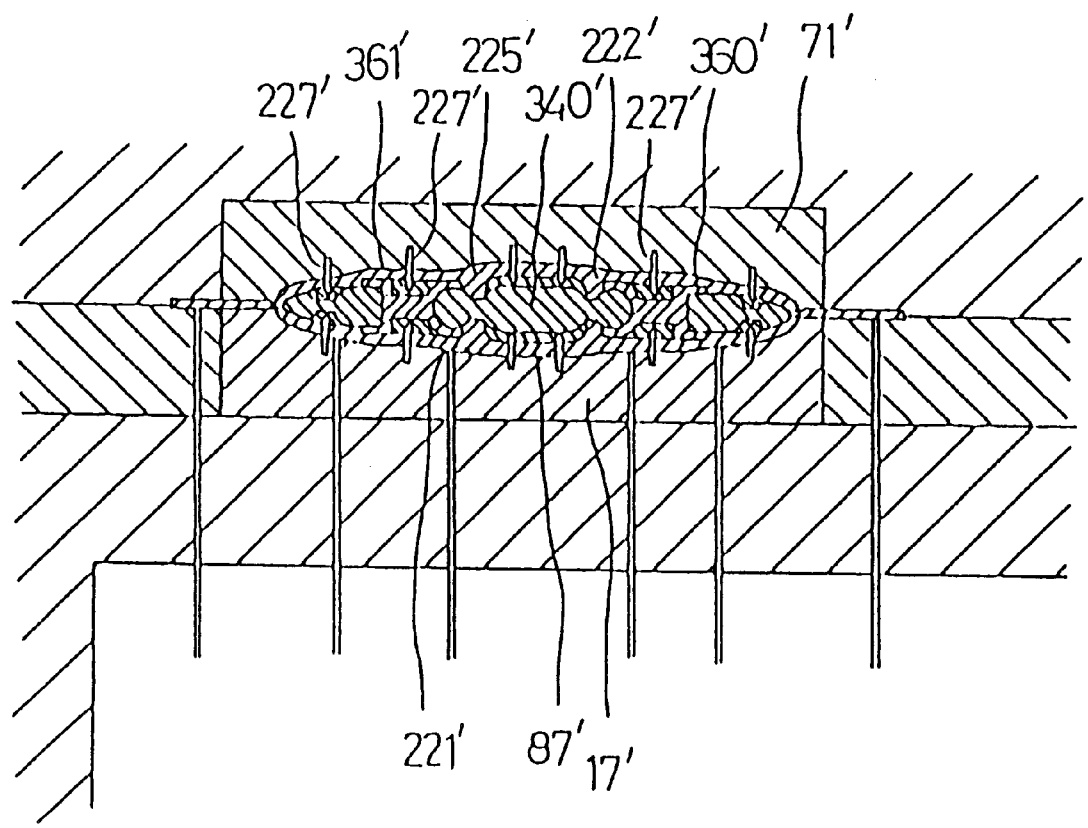
FIG. 33 is a sectional view of part of the secondary mold.
Figure 34:
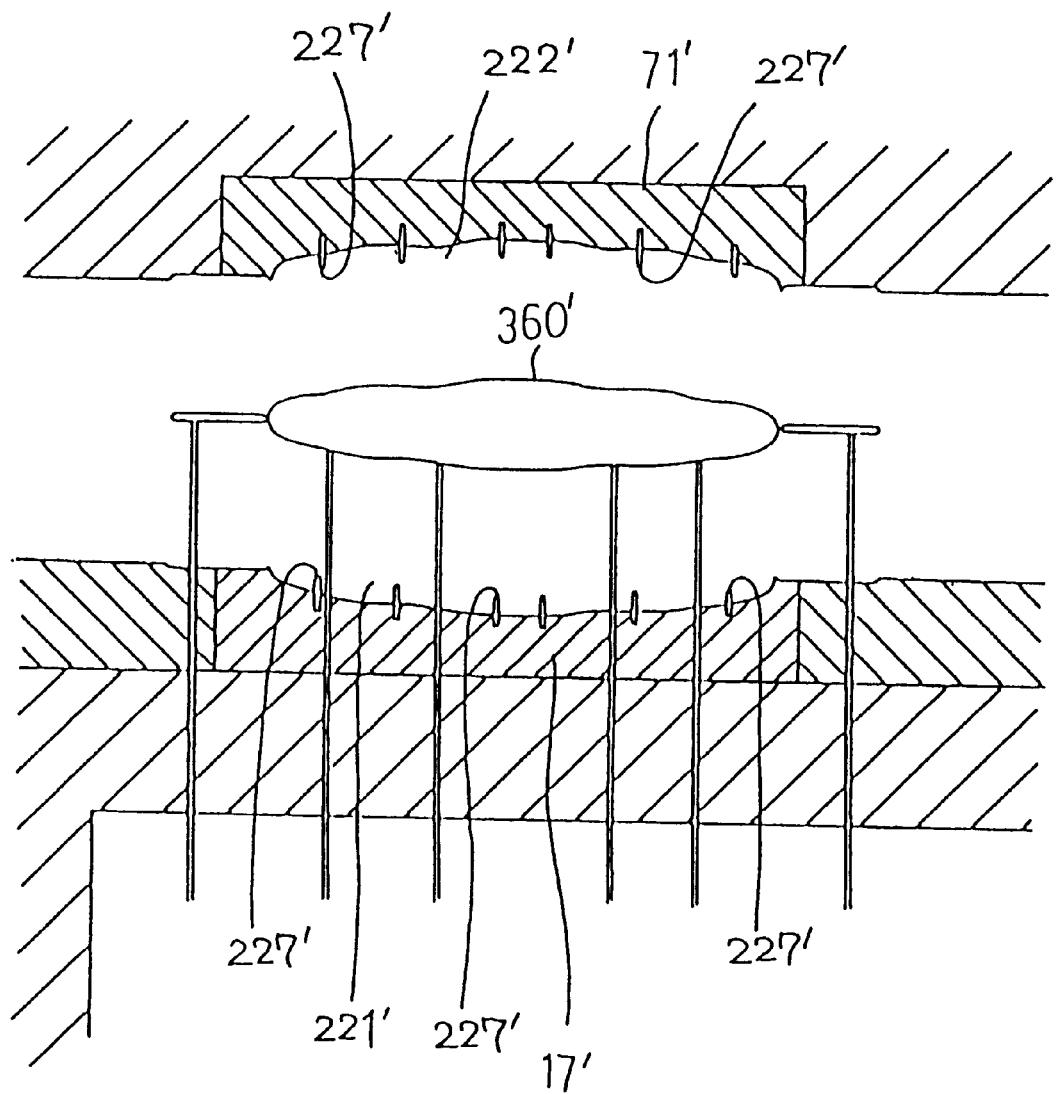
FIG. 34 is a sectional view of part of the secondary mold explaining its movement.

The first embodiment of this invention will be described with reference to FIGS. 30 and 34.

The molding apparatus has a primary mold 85' and a secondary mold 87'. The primary mold 85' comprises a first mold portion 15' having a first mold recess 171' and a second mold portion 69' having a second mold recess 172', and the first and second mold recesses 171' to 172' define a primary mold cavity 173' when the first and second mold portions 15' and 69' are joined together.

The first and second mold portions 15' and 69' have a plurality of protrusions 187' extending into the primary mold cavity 173' to form holes 191' on the surface of a primary product 340' molded by the primary mold cavity 173'.

The secondary mold 87' comprises a third mold portion 17' having a third mold recess 221' and a fourth mold portion 71' having a fourth mold recess 222', and the third and fourth mold recesses 221' and 222' define a secondary mold cavity 225' when the third and fourth mold portions 17' and 71' are joined together.

The third and fourth mold portions 17' and 71' have a plurality of protrusions 227' extending into the secondary mold cavity 225' so that the protrusions 227' may engage in the holes 191' of the primary product 340' placed in the secondary mold cavity 225' to secure it in the secondary mold cavity 225'.

Description will now be made on a process embodying this invention and carried out by employing the apparatus as described above.

A synthetic resin material is injected into the primary mold cavity 173' of the primary mold 85' having the primary mold cavity 173' into which the protrusions 187' extend, whereby the primary product 340' having the holes 191' on its surface is molded (a first molding step).

The protrusions 227' extending into the secondary mold cavity 225' of the secondary mold 87' are engaged in the holes 191' of the primary product 340' formed as a result of the first molding step to secure it in the secondary mold cavity 225', and a synthetic resin material is injected into the secondary mold cavity 225' to form a secondary product 360' having through holes made by the protrusions 227' (a second molding step).

The molded product 360' molded by the apparatus or process as described above comprises the primary product 340' defining its interior and a secondary product 360' defining its exterior. The primary product 340' having the holes 191' on its surface is molded from the synthetic resin material injected into the primary mold cavity 173' of the primary mold 85' having the primary mold cavity 173' into which the protrusions 187' extend.

The secondary product 360' having the through holes made by the protrusions 227' is molded from the synthetic resin material injected into the secondary mold cavity 225' of the secondary mold 87' into which the protrusions 227' extend to engage in the holes 191' of the primary product 340' to secure it in the secondary mold 87'.

The second embodiment of this invention will be described with reference to FIGS. 1 to 29.

In this embodiment, the primary mold 85' and the secondary mold 87' in the first embodiment comprise the tertiary mold 85 and the quaternary mold 87 respectively.

Figure 1:
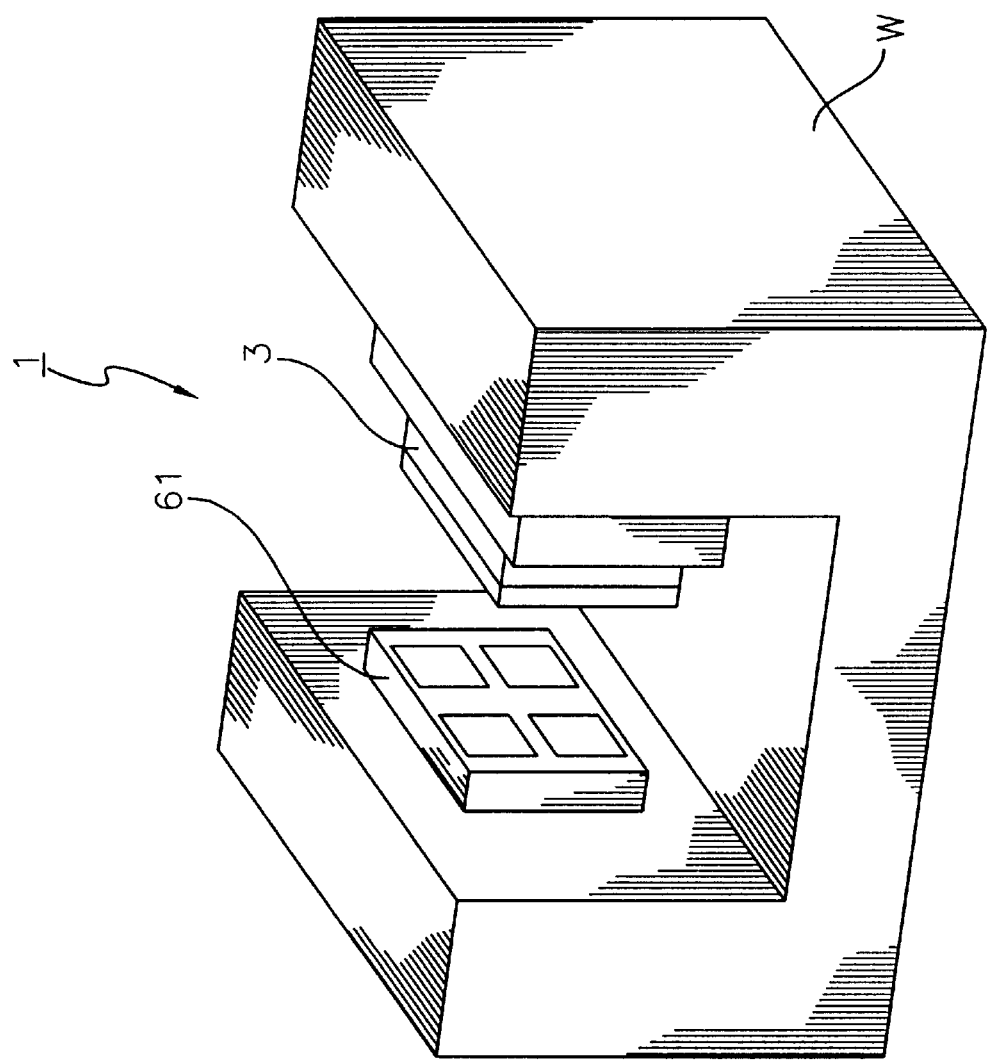
FIG. 1 is a perspective view showing an injection molding machine carrying a molding apparatus according to an embodiment of this invention.

A molding apparatus 1 embodying this invention comprises a movable mold device 3 and a stationary mold device 61 mounted on the movable and stationary sides, respectively, of a known injection molding machine W, as shown in FIG. 1.

Figure 2:
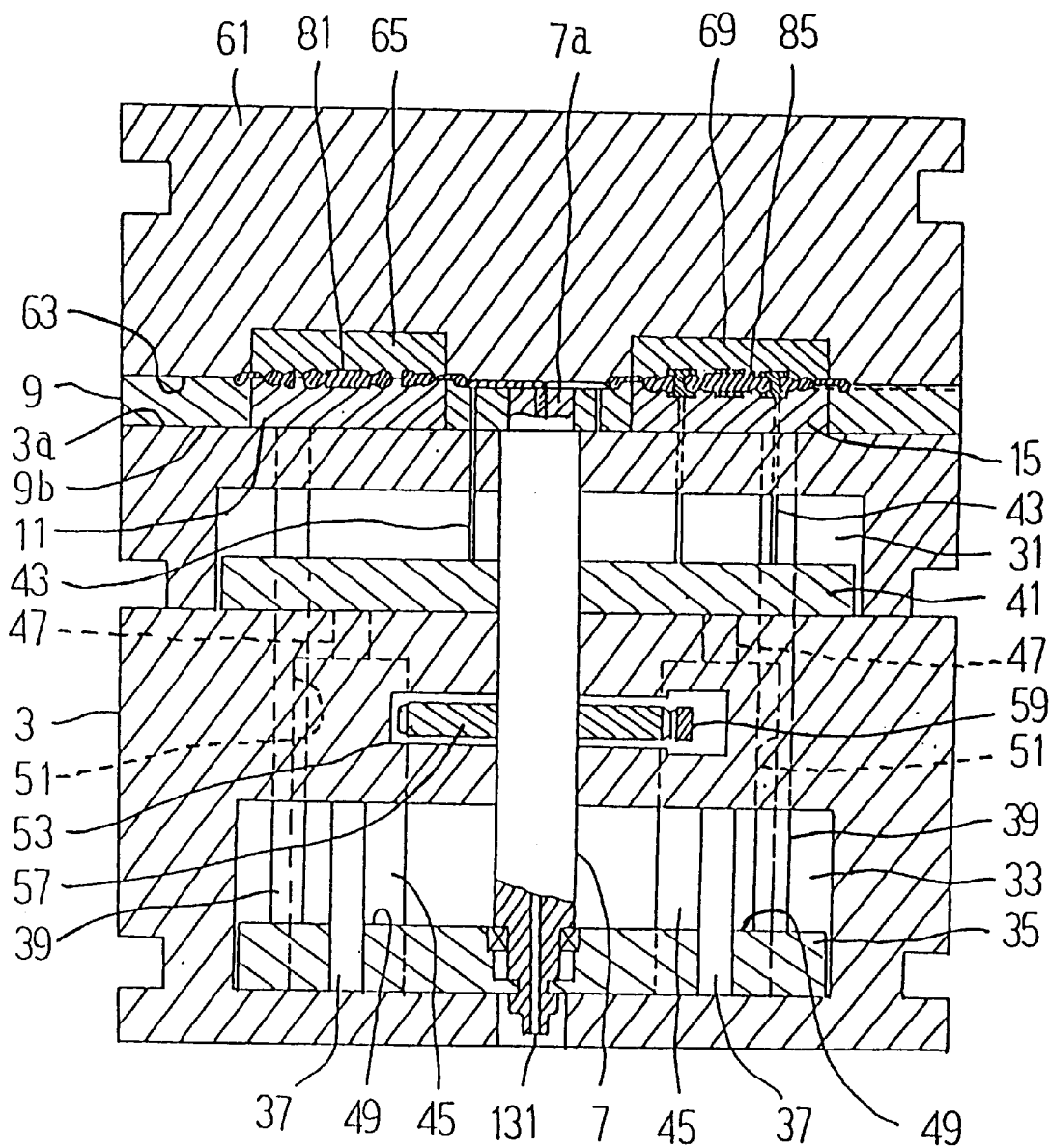
FIG. 2 is a side elevational view of the molding apparatus.
Figure 3:
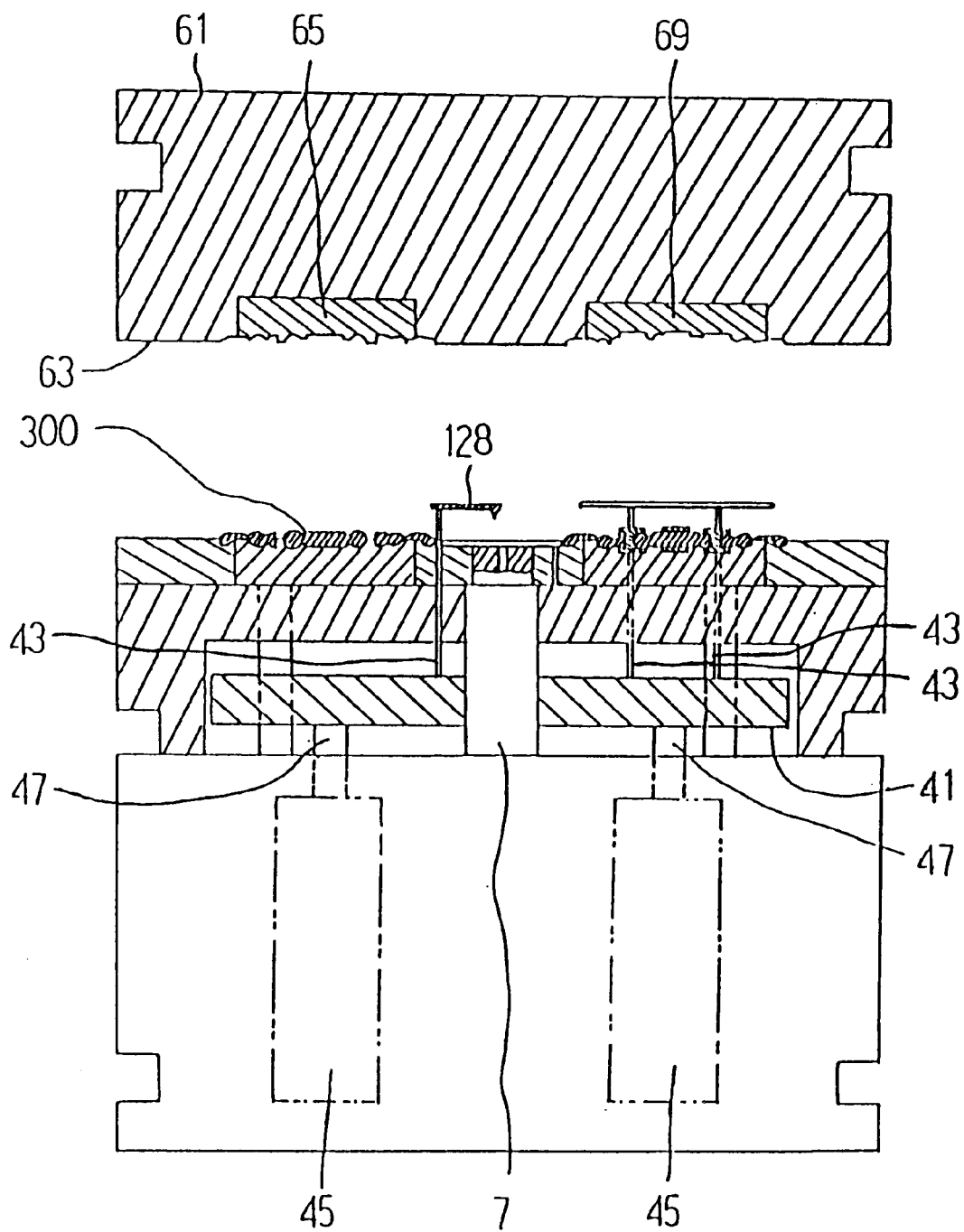
FIG. 3 is a side elevational view, partly simplified of the molding apparatus in its open position.
Figure 4:
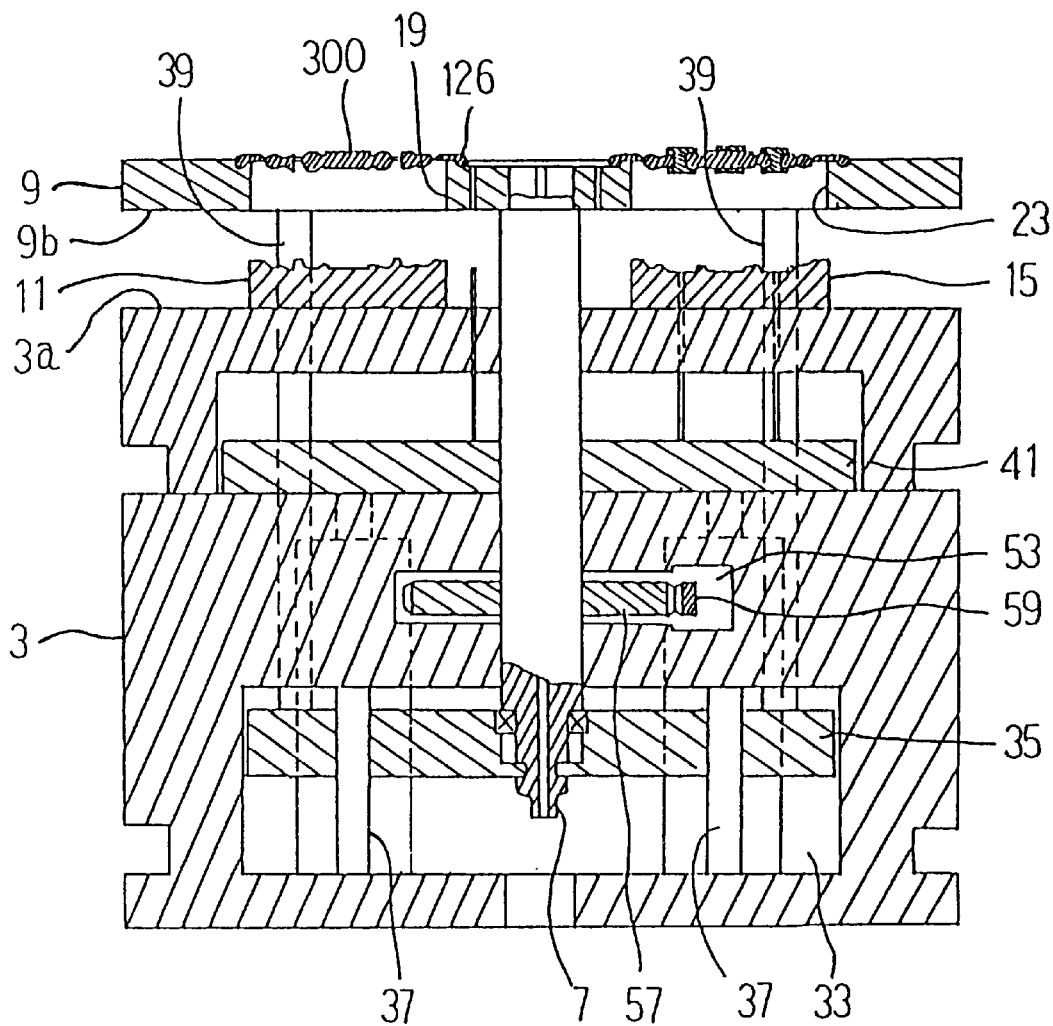
FIG. 4 is a side elevational view, partly simplified of the molding apparatus illustrating an operation thereof.

A rotary shaft 7 extends through approximately the center of the movable mold device 3 rotatably and axially slidably, as shown in FIGS. 2 to 4. The rotary shaft 7 has at its front end an extension 7a about which a rotary table 9 is secured.

Figure 5:
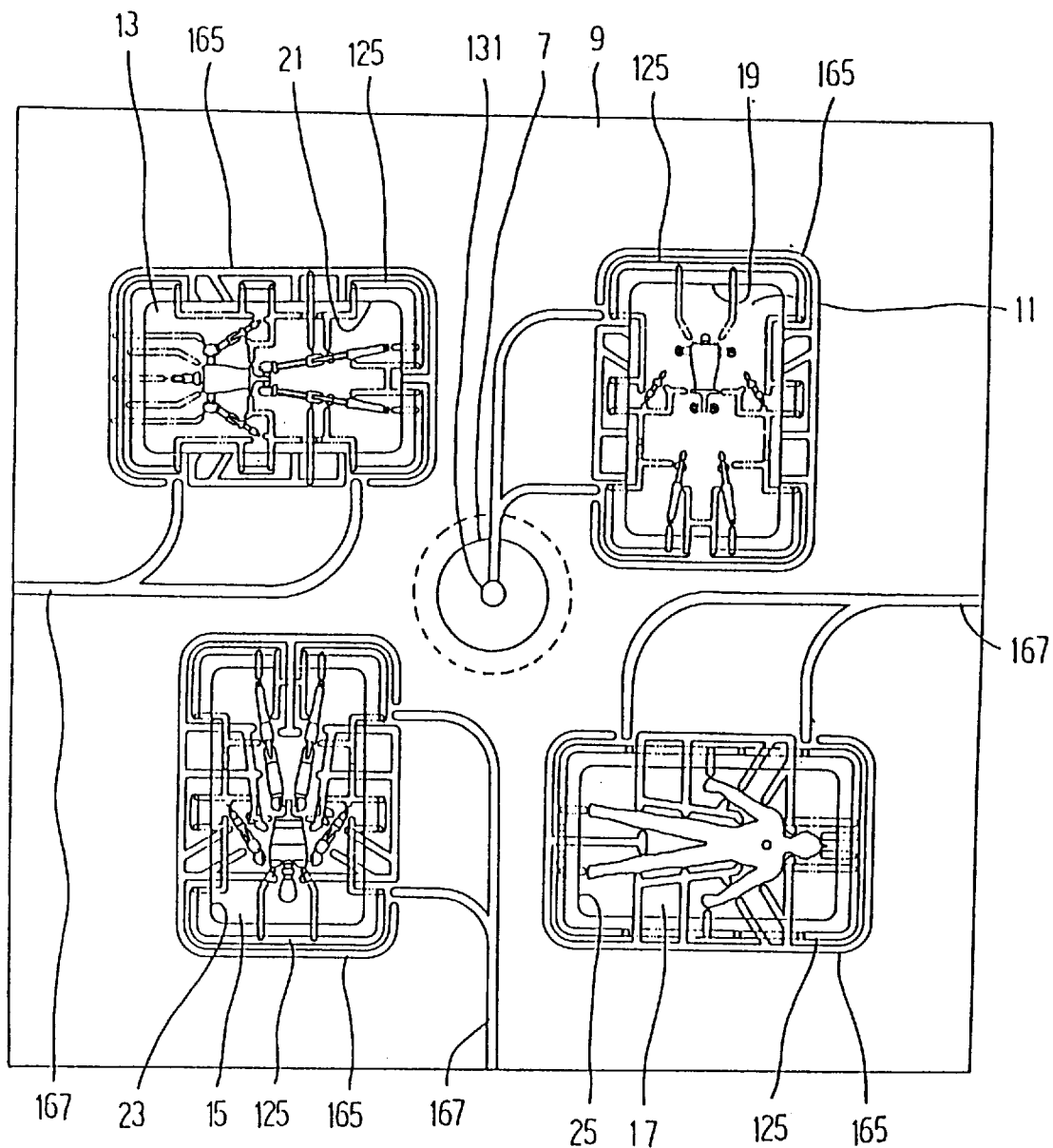
FIG. 5 is a plan view of a movable mold device of the molding apparatus.

The movable mold device 3 has a front surface 3a to which a first movable mold portion 11 for molding a primary product 300, a second movable mold portion 13 for molding a secondary product 320, a third movable mold portion 15 for molding a tertiary product 340 and a fourth movable mold portion 17 for molding a quaternary (or final) product 360 are secured by bolts, etc. at intervals of about 90 degrees about the rotary shaft 7, as shown in FIG. 5. The first to fourth movable mold portions 11 to 17 are of the same dimensions except those of the mold recesses which they define, as will later be described.

The rotary table 9 has a rear surface 9b which can be joined with the front surface 3a of the movable mold device 3. The rotary table 9 has apertures 19, 21, 23 and 25 in which the first to fourth movable mold portions 11, 13, 15 and 17 respectively is fitted snugly. Said movable mold portions 11, 13, 15 and 17 can be fitted snugly to each of the apertures 19, 21, 23 and 25.

The movable mold device 3 has a front chamber 31 and a rear chamber 33. The rear chamber 33 contains a first base 35 which is slidable along guide pins 37. The rotary shaft 7 has a rear end supported rotatably by the first base 35. A plurality of pusher shafts 39 connected at their front ends to the rear surface 9b of the rotary table 9 for pushing it forward extend through the movable mold device 3 and have their rear ends secured to the first base 35.

The front chamber 31 contains a second base 41 which is movable back and forth. A plurality of ejector pins 43 are secured at their rear ends to the second base 41 for ejecting molded products and runners forward, as will be described in detail. A pair of hydraulic cylinders 45 are installed in the rear chamber 33 and have each a drive shaft 47 to which the second base 41 is attached. The hydraulic cylinders 45 are supported at their rear ends in a pair of holes 49 formed in the first base 35 and placed in a pair of recesses 51 formed above the rear chamber 33.

The movable mold device 3 also has an intermediate chamber 53 formed in its approximately middle portion. The intermediate chamber 53 houses a spur gear 57 connected to the rotary shaft 7 by a spline key not shown, and meshing with a rack 59 connected to the drive rod of a hydraulic cylinder (not shown) secured to the movable mold device 3.

The stationary mold device 61 is provided with a first stationary mold portion 65 paired and joined with the first movable mold portion 11 to define a primary mold 81, a second stationary mold portion 67 paired and joined with the second movable mold portion 13 to define a secondary mold 83, a third stationary mold portion 69 paired and joined with the third movable mold portion 15 to define a tertiary mold 85 and a fourth stationary mold portion 71 paired and joined with the fourth movable mold portion 17 to define a quaternary mold 87 embedded in a front surface 63 facing the movable mold device 3.

Figure 6:
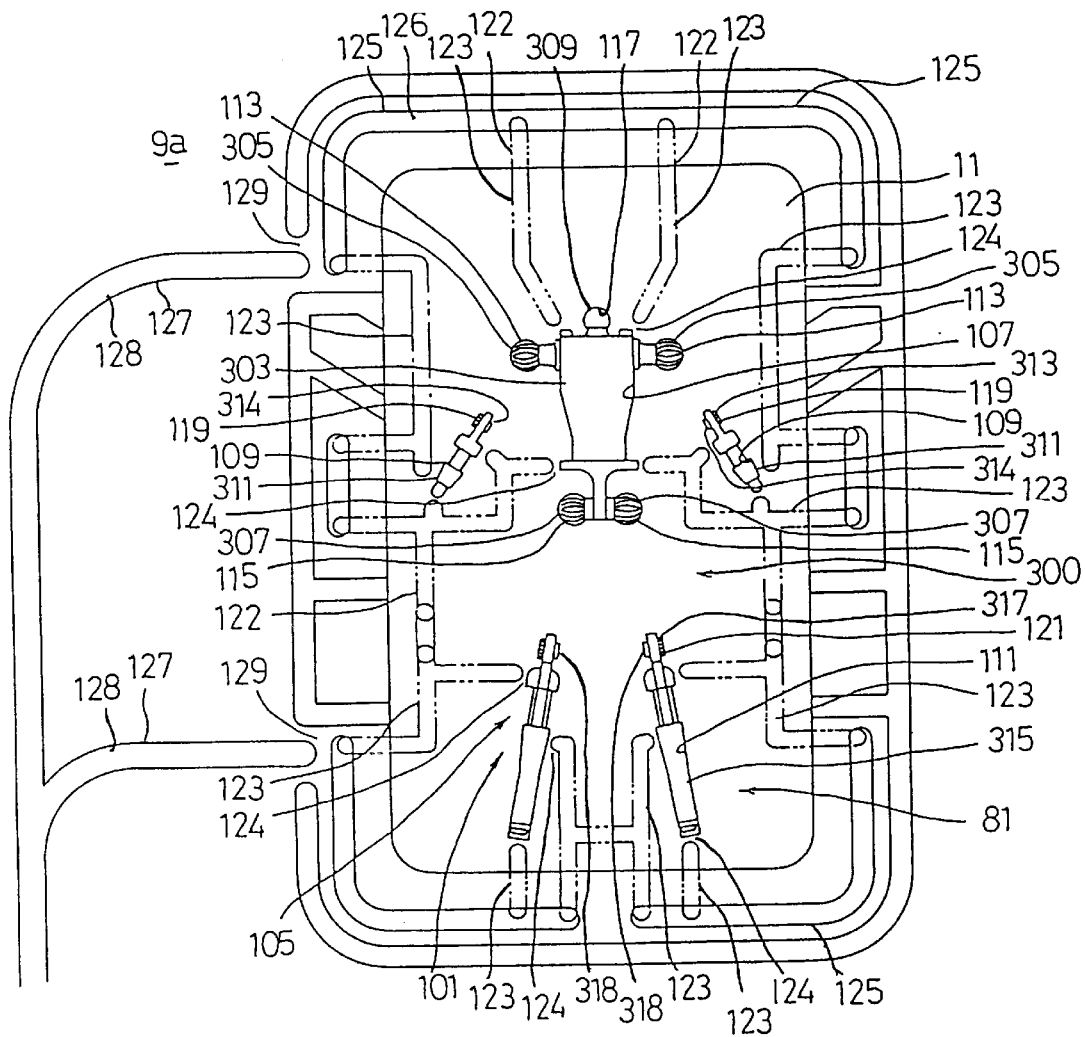
FIG. 6 is a plan view showing a primary mold of the molding apparatus.
Figure 11:
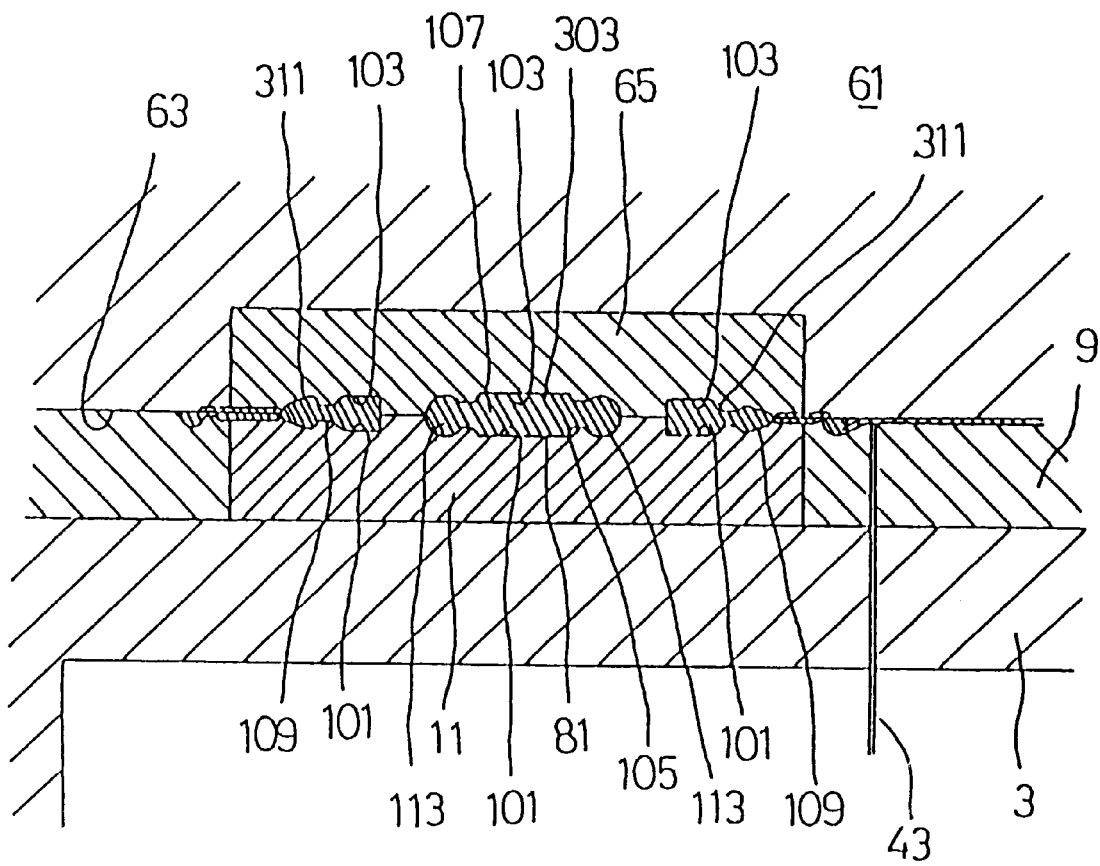
FIG. 11 is a sectional view of part of the primary mold.
Figure 12:
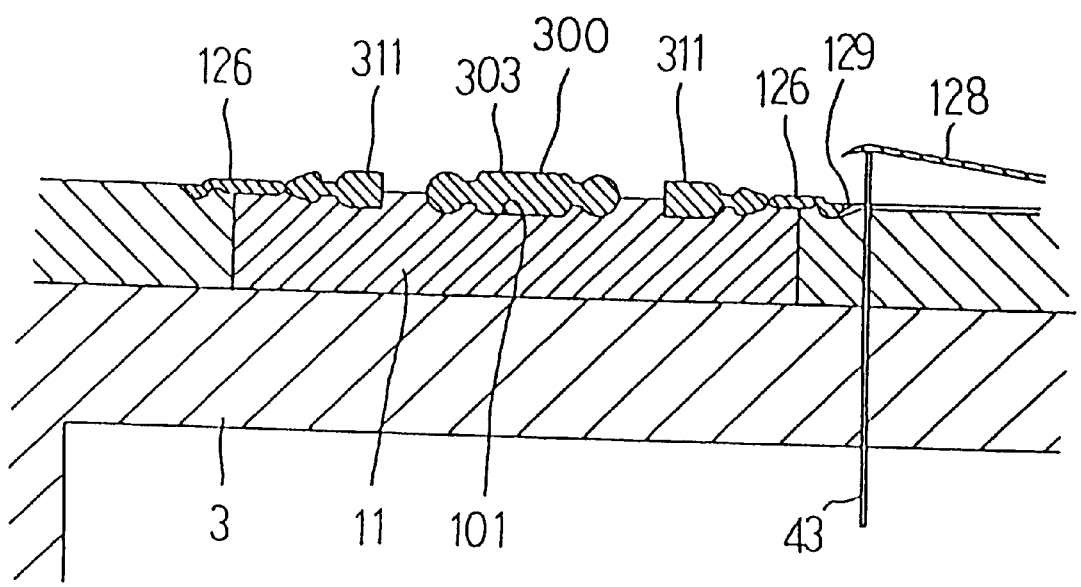
FIG. 12 is a sectional view of part of the primary mold illustrating an operation thereof.

The first movable mold portion 11 has a first movable mold recess 101 formed on its surface, while the first stationary mold portion 65 has a first stationary mold recess 103 formed on its surface, as shown in FIGS. 6, 11 and 12. The first movable mold recess 101 and the first stationary mold recess 103 define a primary mold cavity 105 in the primary mold 81 formed by the first movable and stationary mold portions 11 and 65 joined together as described before, so that a primary product 300 may be molded in the primary mold cavity 105.

The primary mold cavity 105 comprises a trunk cavity 107 for molding the trunk portion 303, lower arm cavities 109 for molding its lower arm portions 311 and lower leg cavities 111 for molding its lower leg portions 315.

The cavity 105 also comprises a pair of shoulder joint cavities 113, 113 at the positions corresponding to the shoulders of its trunk cavity 107 for molding a pair of spherical shoulder joints 305 having a substantially polygonal cross section, a pair of crotch joint cavities 115, 115 at the positions corresponding to the crotches of its trunk cavity 107 for molding a pair of spherical crotch joints 307 having a substantially polygonal cross section and a neck joint cavity 117 at the position corresponding to the neck of its trunk cavity 107 for molding a smooth spherical neck joint 309.

The cavity 105 further comprises elbow joint cavities 119 formed at the positions corresponding to the elbows of its lower arm cavity 109 with a protruding shaft 313 having a substantially polygonal cross section being formed on one side and a supporting shaft 314 having a circular cross section being formed on the opposite side. Moreover, knee joint cavities 121 are formed at the positions corresponding to the knees of its lower leg cavities 111 with a protruding shaft 317 having a substantially polygonal cross section being formed on one side and a supporting shaft 318 having a circular cross section being formed on the opposite side.

The first stationary mold portion 65 has a set of runner channels 123 formed on its front surface for supplying a first synthetic resin material A into the trunk, lower arm and lower leg cavities 107, 109 and 111 of the first mold cavity 105 through gates 124, as shown in FIG. 6. The rotary table 9 has in its front surface 9a runner channels 125 surrounding the first movable mold portion 11 and connected with the runner channels 123. The runner channels 125 are also connected with runner channels 127 through tunnel gates 129 and the runner channels 127 are connected with a material supply passage 131 formed by the rotary shaft 7 and extending from its rear to its front end.

Figure 7:
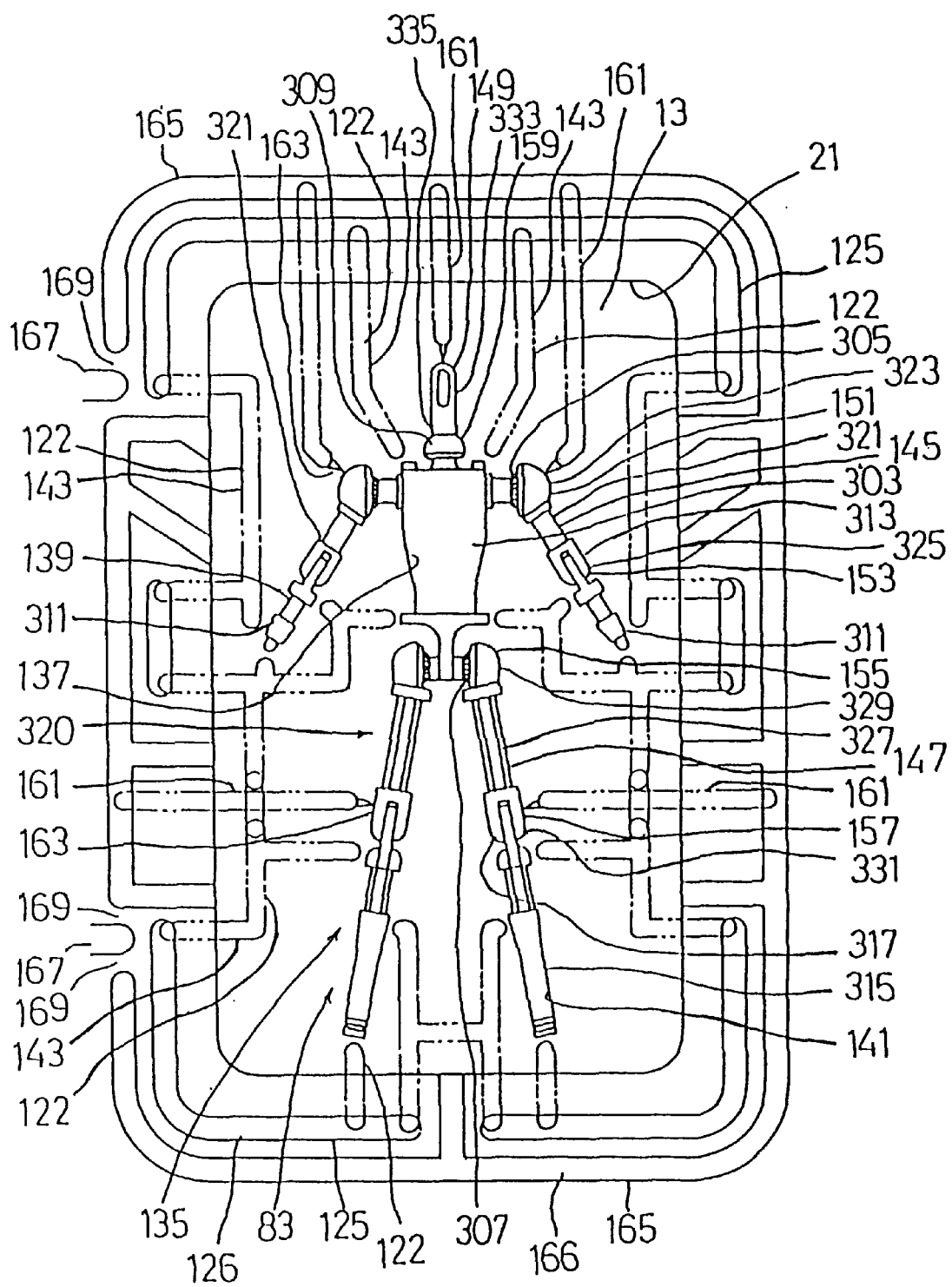
FIG. 7 is a plan view showing a secondary mold of the molding apparatus.
Figure 15:
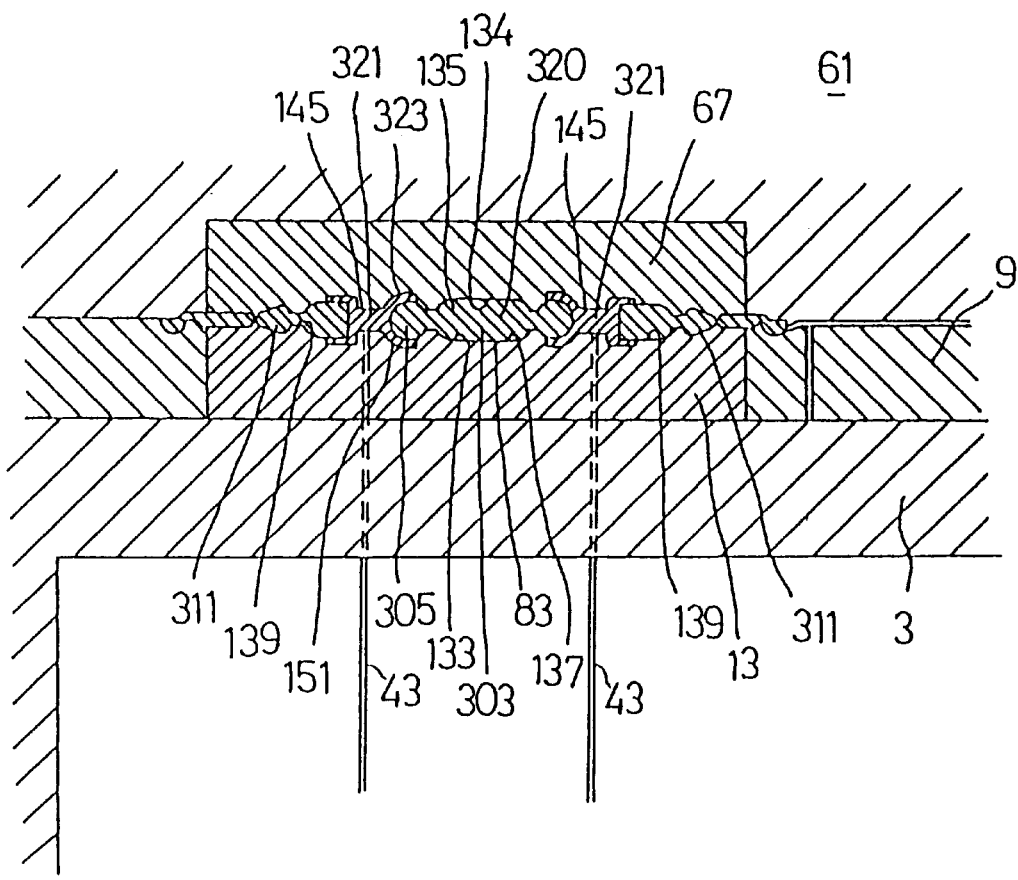
FIG. 15 is a sectional view of part of the secondary mold.

The second movable mold portion 13 has a second movable mold recess 133 formed on its front surface, while the second stationary mold portion 67 has a second stationary mold recess 134, as shown in FIGS. 7 and 15. The second movable mold recess 133 and the second stationary mold recess 134 define a second mold cavity 135 in the secondary mold 83 formed by the second movable and stationary mold portions 13 and 67 joined together as described before, so that a secondary product 320 may be molded in the secondary mold cavity 135.

The secondary mold cavity 135 has a trunk fixing cavity 137 for holding the trunk portion 303 of the primary product 300 molded in the primary mold 81, a pair of lower arm fixing cavities 139 for holding its lower arm portions 311 and a pair of lower leg fixing cavities 141 for holding its lower leg portions 315. The front surface 63 of the stationary mold device 61 and the front surface of the second stationary mold portion 67 have runner fixing channels 143 for holding the runners 122 molded by the runner channels 123.

The secondary mold cavity 135 also has upper arm cavities 145 for molding the upper arm portions 321, upper leg cavities 147 for molding its upper leg portions 327 and a skull cavity 149 for molding its skull portion 333. The cavity 135 also has shoulder shell cavities 151 formed on the side of upper arm cavities 145 each for molding a shoulder shell 323 for inserting each of the spherical shoulder joints 305 molded by the primary mold 81. Elbow bearing cavities 153 are formed on the elbow side of upper arm cavities 145 for molding elbow bearings 325 each for inserting each of the protruding shafts 313 and each of the supporting shafts 314 molded by the primary mold 81.

The cavity further has a pair of crotch shell cavities 155 at the end of its upper leg cavities 147 for molding a crotch shell 329 for one of the spherical crotch joints 307 molded by the primary mold 81, a pair of knee bearing cavities 157 at the end of one of its upper leg cavities 147 for molding a knee bearing 331 for one of the protruding shafts 317 and one of the supporting shafts 318 molded by the primary mold 81, and a neck shell cavity 159 at the end of its skull cavity 149 for molding a neck shell 335 for the spherical neck joint 309 molded by the primary mold 81 to be inserted.

The second stationary mold portion 67 has a set of runner channels 161 formed in its front surface for supplying a second synthetic resin material B into the upper arm, upper leg and skull cavities 145, 147 and 149 of the secondary mold cavity 135 through a set of tunnel gates 163 formed by the second movable mold portion 13. The runner channels 161 are connected with runner channels 165 formed around the runner channels 125 in the rotary table 9. The runner channels 165 are connected with runner channels 167 through tunnel gates 169, and the runner channels 167 are connected with an injection unit not shown, but forming a part of the injection molding machine W and connected to the movable or stationary mold device 3 or 61.

Figure 8:
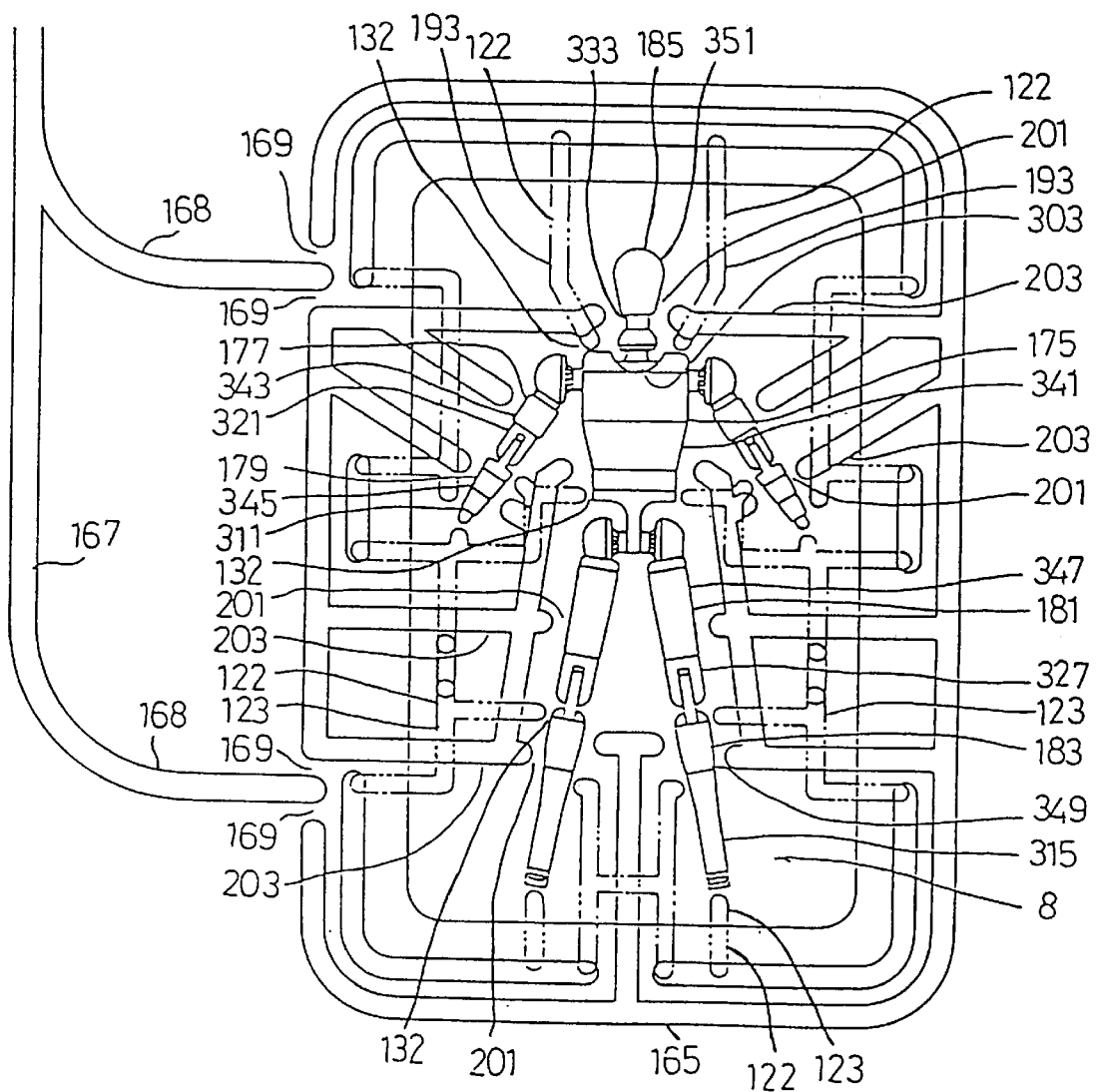
FIG. 8 is a plan view showing a tertiary mold of the molding apparatus.
Figure 20:
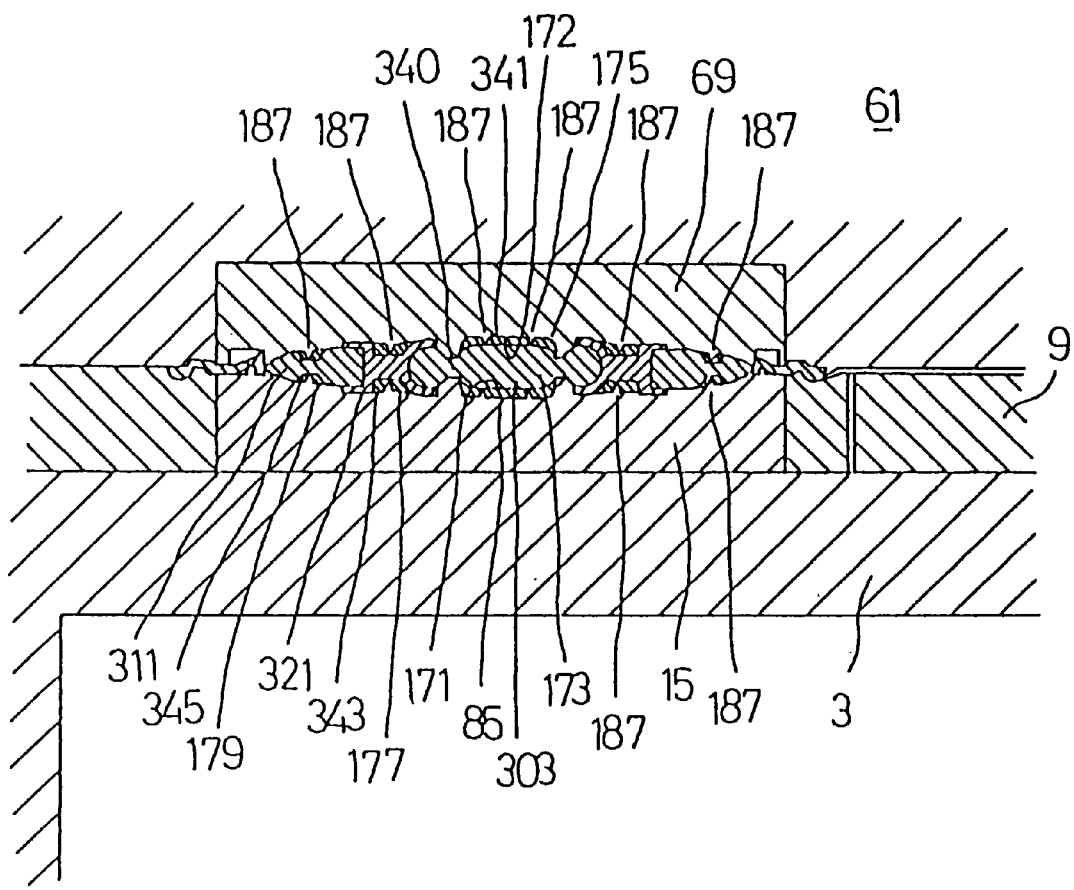
FIG. 20 is a sectional view of part of the tertiary mold.

The third movable mold portion 15 has a third movable mold recess 171 formed on its front surface, while the third stationary mold portion 69 has a third stationary mold recess 172 formed on its front surface, as shown in FIGS. 8, 20 and (b) of 21. The third movable and stationary mold recesses 171 and 172 define a tertiary mold cavity 173 for molding a tertiary product 340 in the tertiary mold 85 formed by the third movable and stationary mold portions 15 and 69 joined together.

The tertiary mold cavity 173 has a trunk flesh cavity 175 for molding the trunk flesh portion 341 of the tertiary product 340 by insert molding about the trunk portion 303 of the primary product 300, a pair of upper arm flesh cavities 177 for molding its upper arm flesh portions 343 by insert molding about the upper arm portions 321 of the secondary product 320 and a pair of lower arm flesh cavities 179 for molding its lower arm portions 345 by insert molding about the lower arm portions 311 of the primary product 300. The cavity 173 also has a pair of upper leg flesh cavities 181 for molding the upper leg flesh portions 347 of the tertiary product 340 by insert molding about the upper leg portions 327 of the secondary product 320, a pair of lower leg flesh cavities 183 for molding its lower leg flesh portions 349 by insert molding about the lower leg portions 315 of the primary product 300 and a skull flesh cavity 185 for molding its skull flesh portion 351 by insert molding about the skull portion 333 of the secondary product 320.

The third movable mold recess 171 of the third movable mold portion 15 and the third stationary mold recess 172 of the third stationary mold portion 69 have protrusions 187 formed integrally or separately therein and extending into near the trunk portion 303, upper arm portion 321, lower arm portion 311, upper leg portion 327 and lower leg portion 315 which are placed in the tertiary mold cavity 173. Engaging holes 191 are therefore formed by the protrusion 187 in the trunk, upper and lower arm, and upper and lower leg flesh portions 341, 343, 345, 347 and 349 which are molded in the trunk, upper and lower arm, and upper and lower leg flesh cavities 175, 177, 179, 181 and 183, respectively.

The third stationary mold portion 69 has runner fixing channels 193 formed on its front surface for holding and securing the runners 122, . . . molded in the runner channels 123, . . . . The runner fixing channels 193 have recesses 195 formed at positions corresponding to those of connecting ends 132 molded by the gates 124 of the runner channels 123. The third movable mold portion 15 has protrusions 197 integrally or separately formed on its front surface for separating the connecting ends 132 of the runners 122 from the molded product and forcing them into the recesses 195.

The third movable mold portion 15 has a set of runner channels 203 formed on its front surface for supplying a third synthetic resin material C into the trunk, upper and lower arm, and upper and lower leg flesh cavities 175, 177, 179, 181 and 183 of the tertiary mold cavity 173 through gates 201. The runner channels 203 are connected with t he runner channels 165 in the rotary table 9 which is in turn connected through the tunnel gates 169 with the runner channels 167 which are connected with the injection unit not shown, but forming a part of the injection molding machine W and connected to the movable or stationary mold device 3 or 61.

Figure 9:
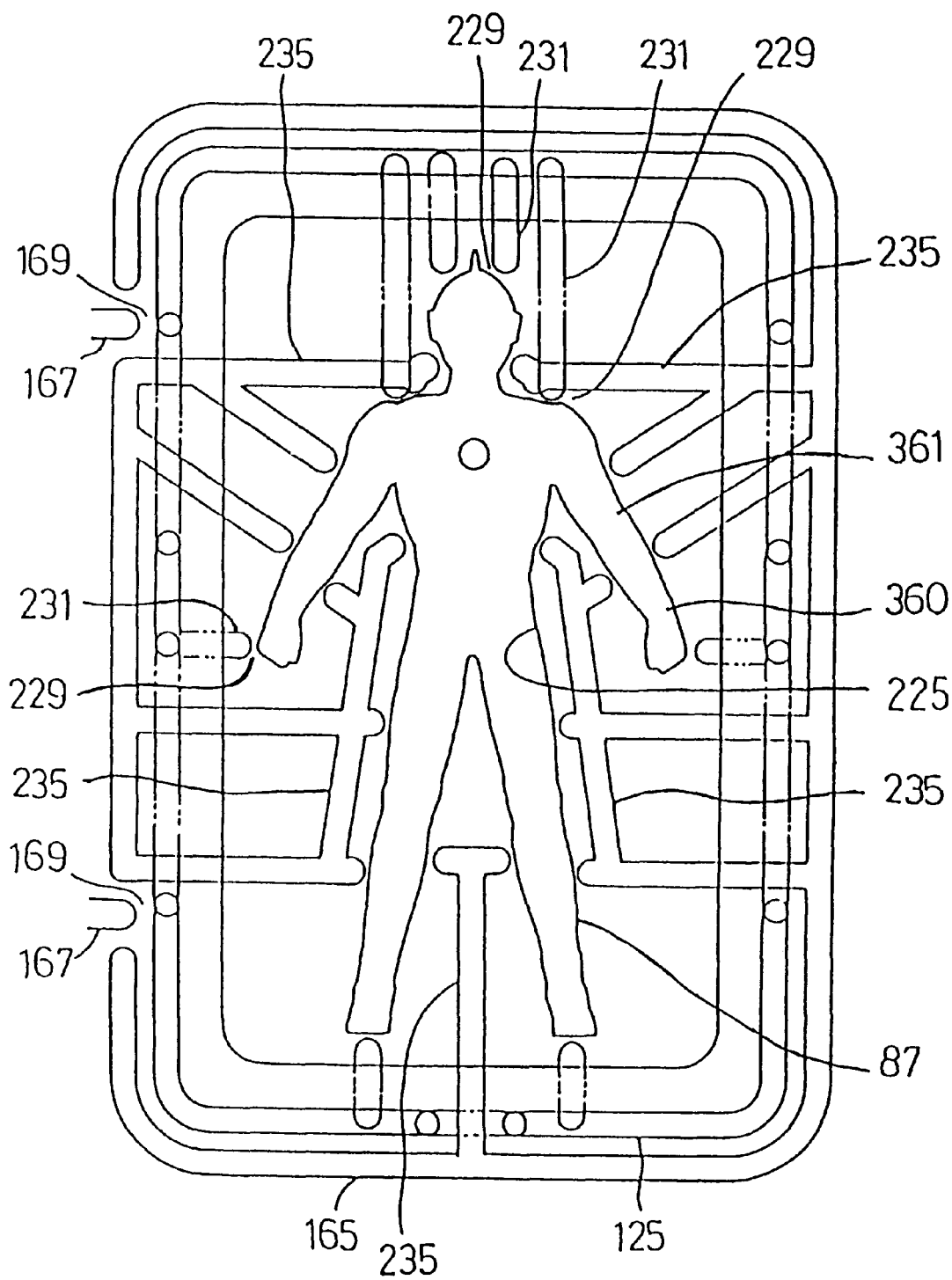
FIG. 9 is a plan view showing a quaternary mold of the molding apparatus.
Figure 26:
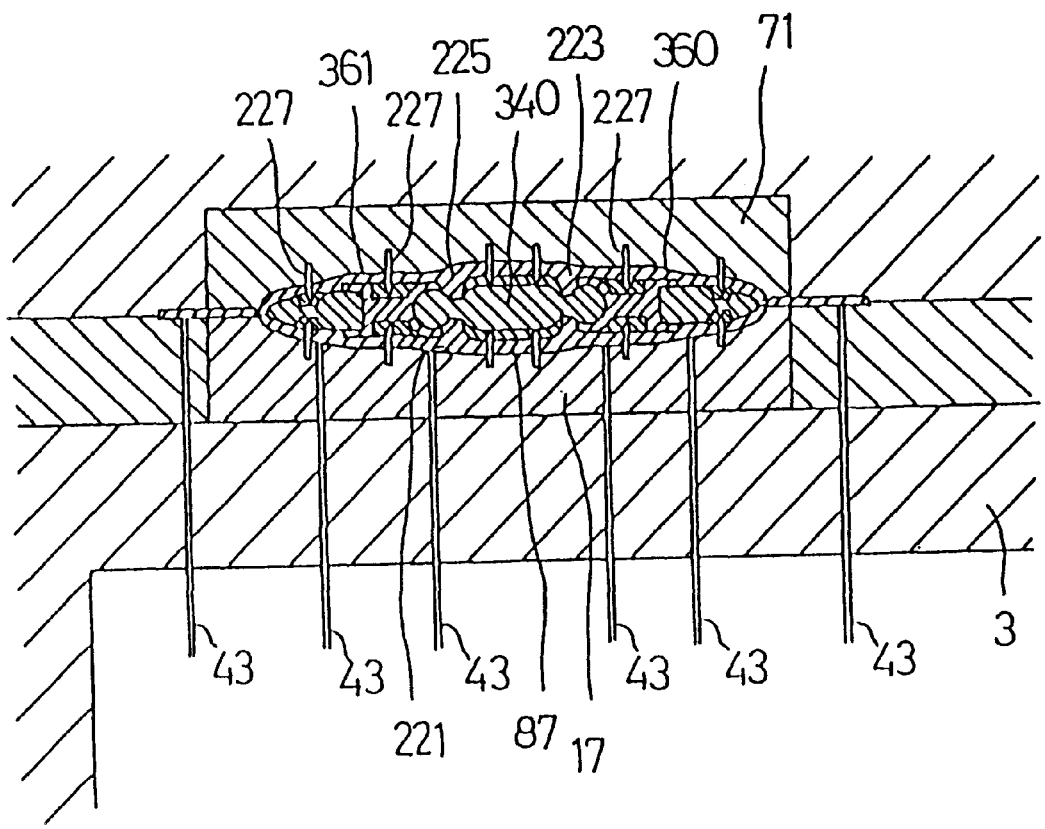
FIG. 26 is a sectional view of part of the quaternary mold.

The fourth movable mold portion 17 has a fourth movable mold recess 221 formed on its front surface, while the fourth stationary mold portion 71 has a fourth stationary mold recess 222 formed on its front surface, as shown in FIGS. 9 and 26. The fourth movable and stationary mold recesses 221 and 222 define a quaternary mold cavity 225 for molding a quaternary product 360 in the quaternary mold 87 formed by the fourth movable and stationary mold portions 17 and 71 joined together.

The quaternary mold cavity 225 is employed for molding an overall covering 361 by insert molding over the tertiary product 340. The fourth movable and stationary mold recesses 221 and 222 have protrusions 227 integrally or separately provided to be engaged in the holes 191 formed in the trunk, upper and lower arm, and upper and lower leg portions 341, 343, 345, 347 and 349 by the protrusions 187.

The fourth stationary mold portion 71 has a set of runner channels 231 formed on its front surface for supplying a fourth synthetic resin material D into the quaternary mold cavity 225 through gates 229. The runner channels 231 are connected with the runner channels 125 which are connected with the runner channels 167 through the tunnel gates 169.

Figure 27:
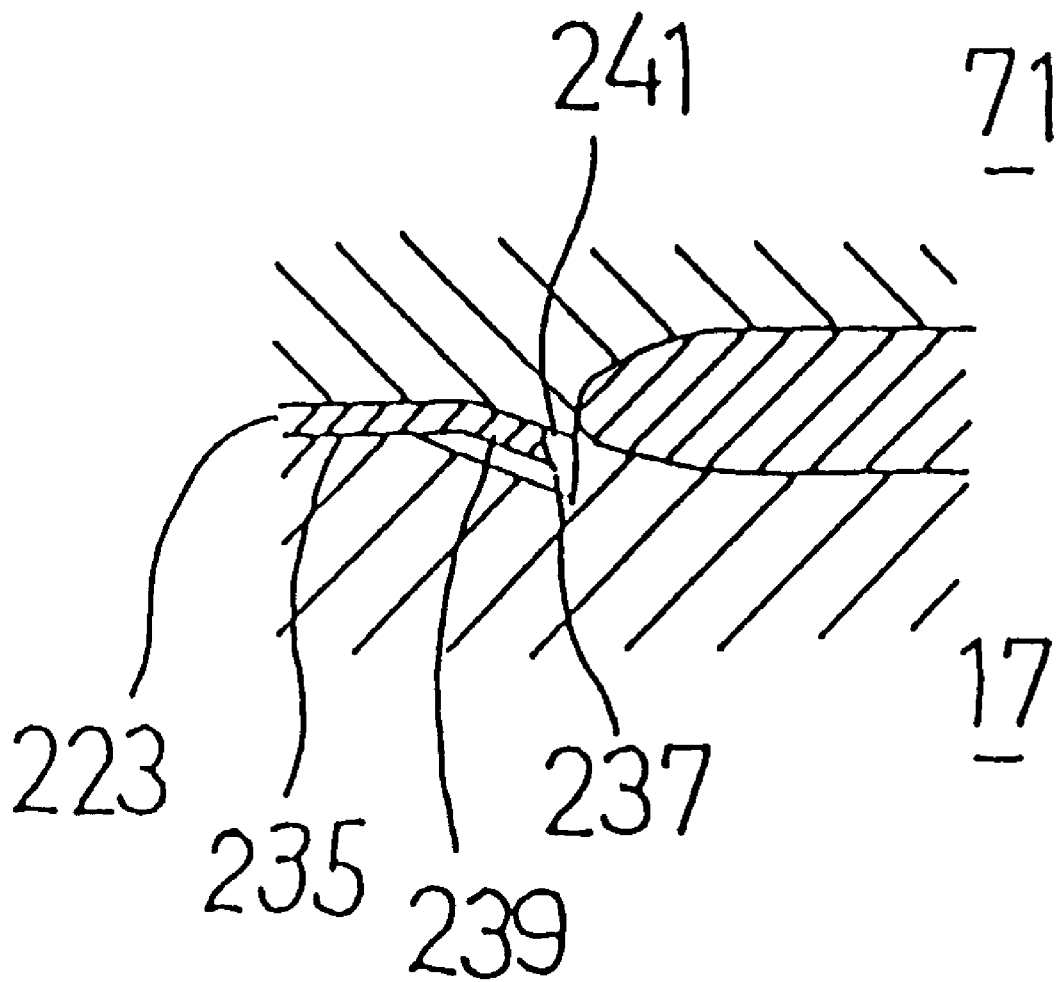
FIG. 27 is an enlarged sectional view of part of the quaternary mold.

The fourth movable mold portion 17 has runner fixing channels 235 formed on its front surface for holding runners 223 molded by in the runner channels 203. The runner channels 235 have recesses 237 for receiving those ends 239 of the runners 223 which are molded by the gates 201 of the runner channels 203, and connected to the molded product, when they are severed from the molded product, as shown in FIG. 27. The fourth stationary mold portion 71 has protrusions 241 formed on its front surface for severing the ends 239 of the runners 223 from the molded product and forcing them into the recesses 237. The protrusions 241 may or may not form integral parts of the mold portion 71.

Description will now be made of the operation of the molding apparatus 1 as described above. The movable mold device 3 is secured to the movable side of the injection molding machine W, and the stationary mold device 61 is secured to its stationary side (see FIG. 1). The injection nozzle, not shown, of the molding machine W is connected to the rear end of the rotary shaft 7 in the movable mold device 3, and the injection unit, not shown, of the injection molding machine W is connected to the movable mold device 3 so as to be connected with each runner channel 167.

The injection molding machine W is driven to join the movable mold device 3 with the stationary mold device 61, as shown in FIG. 2. As a result, the first movable mold portion 11 is joined with the first stationary mold portion 65 to define the primary mold 81 and the second movable mold portion 13 is joined with the second stationary mold portion 67 to define the secondary mold 83, while the third movable mold portion 15 is joined with the third stationary mold portion 69 to define the tertiary mold 85 and the fourth movable mold portion 17 is joined with the fourth stationary mold portion 71 to define the quaternary mold 87.

Figure 10:
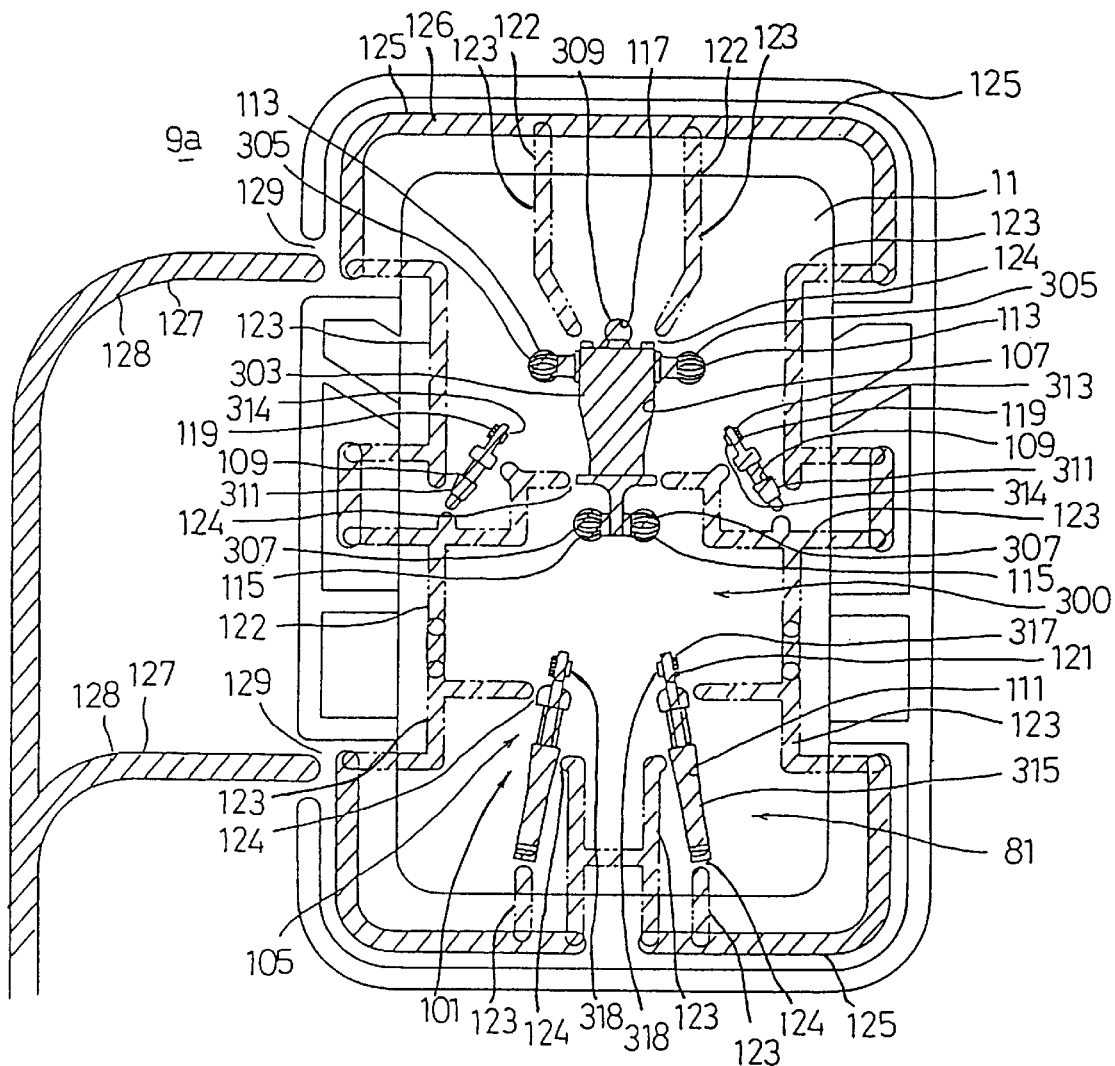
FIG. 10 is a plan view showing the flow of a synthetic resin material in the primary mold.

The first synthetic resin material A is injected from the injection nozzle into the trunk, lower arm and lower leg cavities 107, 109 and 111 of the primary mold cavity 105 in the primary mold 81 through the material supply passage 131 in the rotary shaft 7, the runner channels 127 in the rotary table 9, its tunnel gates 129 and runner channels 125 and the runner channels 123 in the first stationary mold portion 65, as shown in FIG. 10. As a result, the trunk portion 303 of the primary product 300 is molded in the trunk cavity 107 of the primary mold cavity 105, its lower arm portions 311 in the lower arm cavities 109 thereof and its lower leg portions 315 in the lower leg cavities 111 thereof, while the runners 126 are molded in the runner channels 127, the runners 126 in the runner channels 125 and the runners 122 in the runner channels 123.

The trunk portion 303 has at its shoulders spherical shoulder joints 305, 305 having a substantially polygonal cross section molded by the shoulder joint cavities 113, 113. At the crotch of the trunk portion 303, its spherical crotch joints 307, 307 having a substantially polygonal cross section molded by the crotch joint cavities 115, 115. At the neck of the trunk portion 303, the smooth spherical neck joint 309 is molded by the neck joint cavity 117. The neck joint 309 may alternatively have a substantially polygonal cross section.

The elbow joint of the lower arm portion 311 has a protruding shaft 313 having a substantially polygonal cross section and a supporting shaft 314 having a circular cross section molded by the elbow joint cavity 119. At the knee joints of lower leg portions 315, a protruding shaft 317 having a substantially polygonal cross section and a supporting shaft 318 having a circular cross section are formed by the knee joint cavity 121. In this embodiment, the protruding shafts 313, 317 are provided on one side and the supporting shafts 314 and 318 are provided on the opposite side. However, the protruding shaft 313 or 317 may of course be provided on both sides. The polygonal cross section of any of the joints is preferably at least hexagonal.

While a primary product 300 comprising trunk portion 303, lower arm portion 311 and lower leg portion 315 are molded by the primary mold 81 as described above, a secondary, a tertiary and a quaternary products 320, 340 and 360 are simultaneously molded by the secondary, tertiary and quaternary molds 83, 85 and 87, respectively.

When the injection molding machine W is, then, driven to separate the movable mold device 3 from the stationary mold device 61 as shown in FIG. 3, the primary product 300 stays stuck on the movable mold device 3, as shown in FIG. 12. On actuating the drive shafts 47 of the hydraulic cylinders 45 to move the second base 41 forward, a plurality of the ejector pins 43 protrude forward. The runners 128 are ejected by a part of a plurality of the ejector pins 43, as shown in FIG. 6. Since the runners 126 are connected to the runners 128 at the tunnel gates 129, upon ejection of the runners 128, the runners 128 are cut off by the tunnel gate 129 and only the runners 128 are ejected. The ejection of such unnecessary runners by the ejector pins 43 takes place in the secondary, tertiary and quaternary molds 83, 85 and 87, too.

Figure 13:
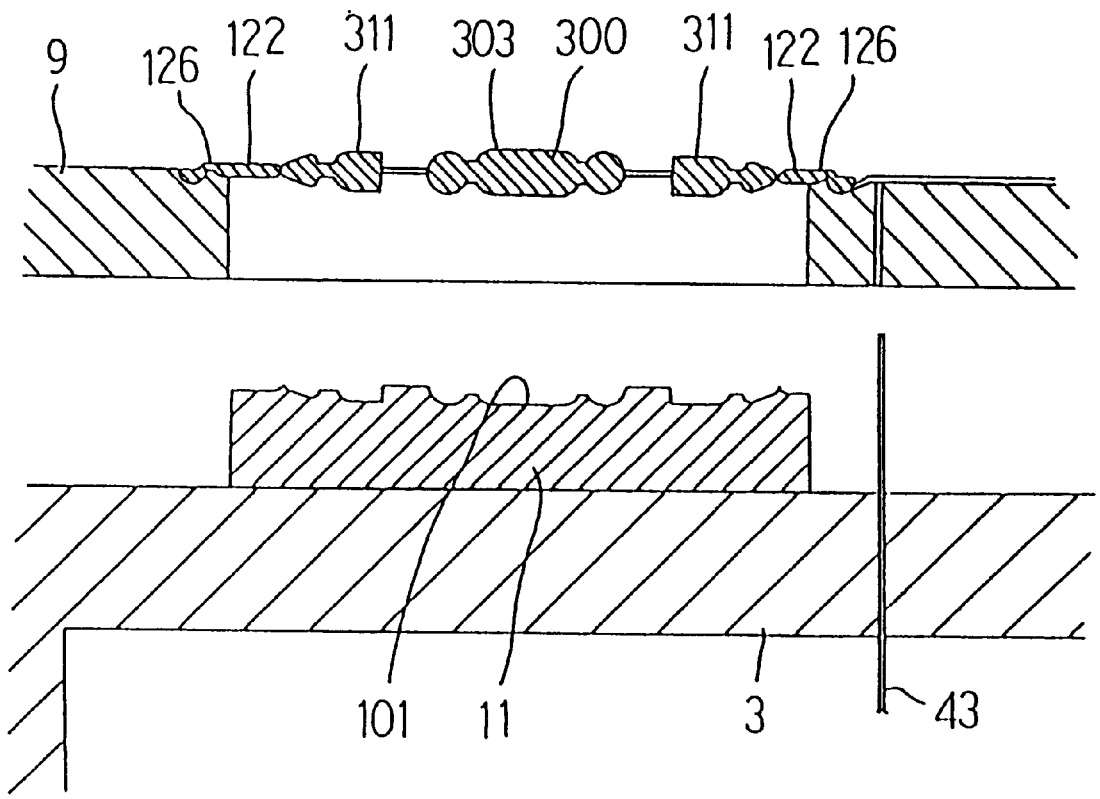
FIG. 13 is a sectional view of part of the primary mold illustrating an operation thereof.

The drive shafts 47 of the hydraulic cylinders 45 are actuated to move back the second base 41 to its original position and thereby the ejector pins 43, and the first base 35 is moved forward, as shown in FIG. 4. The rotary table 9 is moved forward by the rotary shaft 7 and the pusher shafts 39. As a result, the trunk, lower arm and lower leg portions 303, 311 and 315 of the primary product 300 are separated from the first movable mold portion 11, as shown in FIG. 13, since they are connected by the runners 122 to the runners 126 adhering to the rotary table 9.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 is placed in the third movable mold recess 171 of the third movable mold portion 15, and the tertiary product 340 is placed in the fourth movable mold recess 221 of the fourth movable mold portion 17.

The injection molding machine W is driven again to join the movable mold device 3 with the stationary mold device 61, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

As a result, the primary product 300 now stays in the secondary mold cavity 135 of the secondary mold 83 with its trunk portion 303 held in the trunk fixing cavity 137 of the mold cavity 135, its lower arm portions 311 held in the lower arm fixing cavities 139 thereof and its lower leg portions 315 held in the lower leg fixing cavities 141 thereof, while the runners 122 are held in the runner channels 143 of the third stationary mold portion 69.

Figure 14:
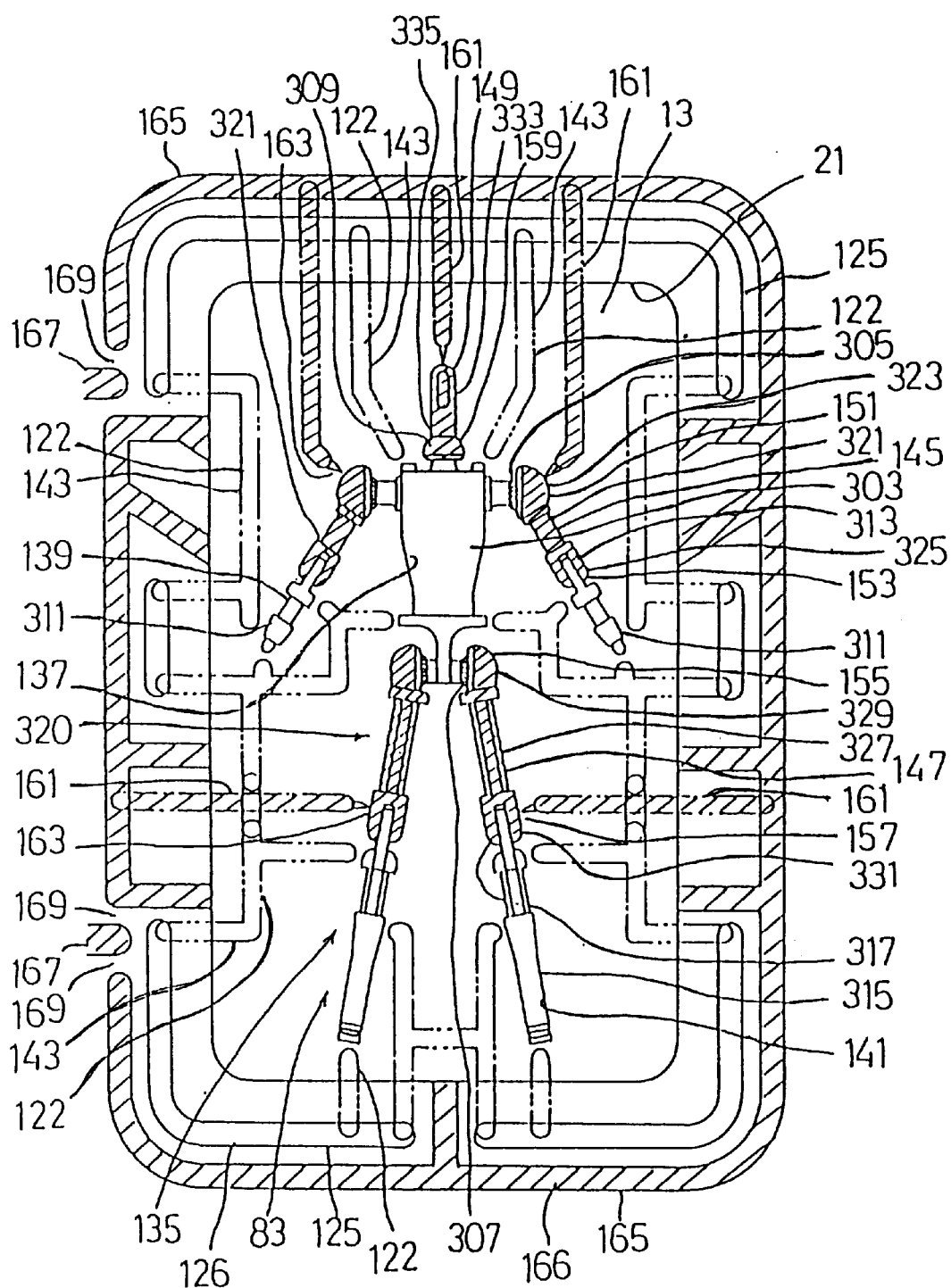
FIG. 14 is a plan view showing the flow of a synthetic resin material in the secondary mold.

The second synthetic resin material B having a melting point lower than that of the first synthetic resin material A is injected from the injection unit, not shown, of the injection molding machine W into the upper arm, upper leg and skull cavities 145, 147 and 149 of the secondary mold cavity 135 through the runner channels 167, tunnel gates 169, runner channels 165 and 161 and tunnel gates 163, as shown in FIG. 14.

As a result, the runners 168 are molded by the runner channels 167, the runners 166 and 162 in the runner channels 165 and 161, the upper arm portions 321 of the secondary product 320 in the upper arm cavities 145 of the mold cavity 135, its upper leg portions 327 in the upper leg cavities 147 thereof, and its skull portion 333 in the skull cavity 149 thereof.

Figure 16:
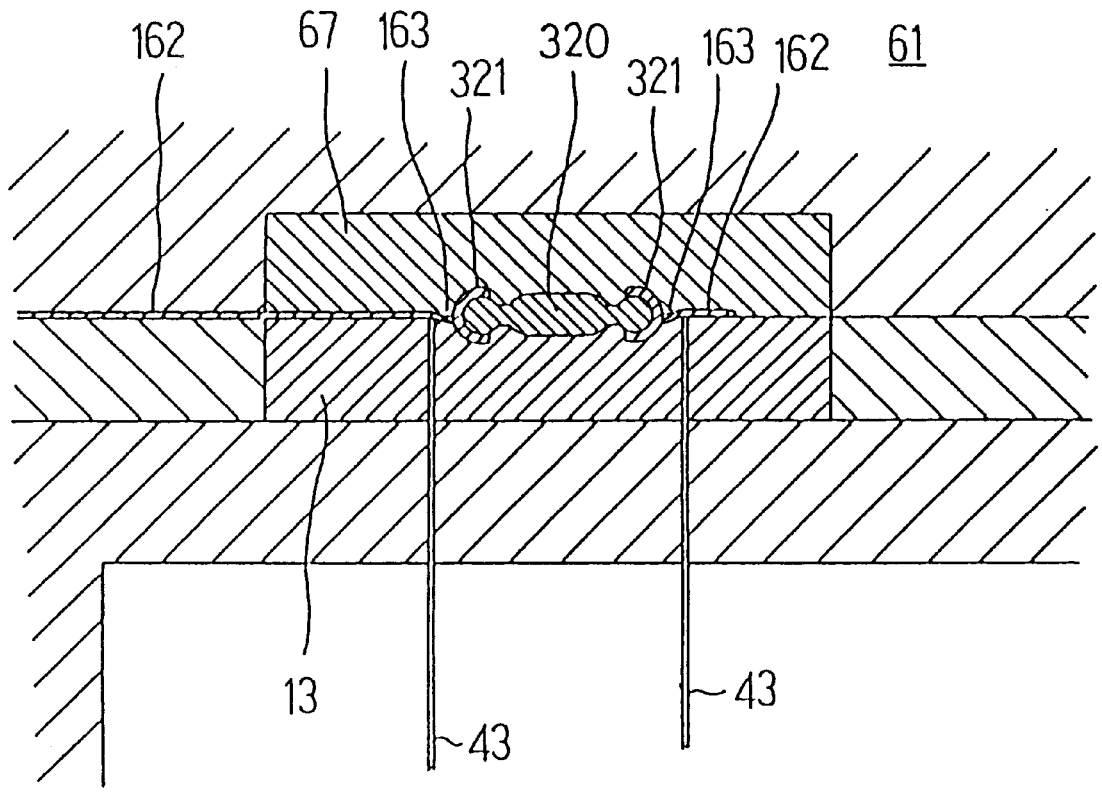
FIG. 16 is a sectional view of part of the secondary mold.

The upper arm portion 321 is formed to have a shoulder shell 323 enclosing the spherical shoulder joints 305 of the trunk portion 303 by means of the shoulder shell cavity 151, and an elbow bearing 325 enclosing one of the protruding shafts 313 and the supporting shafts 314 of the lower arm portions 311 by means of the elbow bearing cavities 153, as shown in FIGS. 7, 15 and 16. The upper leg portion 327 is formed to have a crotch shell 329 enclosing the spherical crotch joint 307 of the trunk portion 303 by means of the crotch shell cavity 155, and a knee bearing 331 enclosing the protruding and supporting shafts 317 and 318 of the lower leg portion 315 by means of the knee bearing cavity 157.

The skull portion 333 is formed to have a neck shell 335 enclosing the spherical neck joint 309 of the trunk portion 303 by means of the neck shell cavity 159.

While the secondary product 320 is molded by the secondary mold 83, having upper arm portions 321 joined to the trunk and lower arm portions 303 and 311 of the primary product 300, upper leg portions 327 joined to the trunk and lower leg portions 303 and 315 thereof, and skull portion 333 joined to the trunk portion 303 thereof, as described above, another primary product 300, another tertiary product 340 and another quaternary product 360 are simultaneously molded by the primary, tertiary and quaternary molds 81, 85 and 87, respectively.

Figure 17:
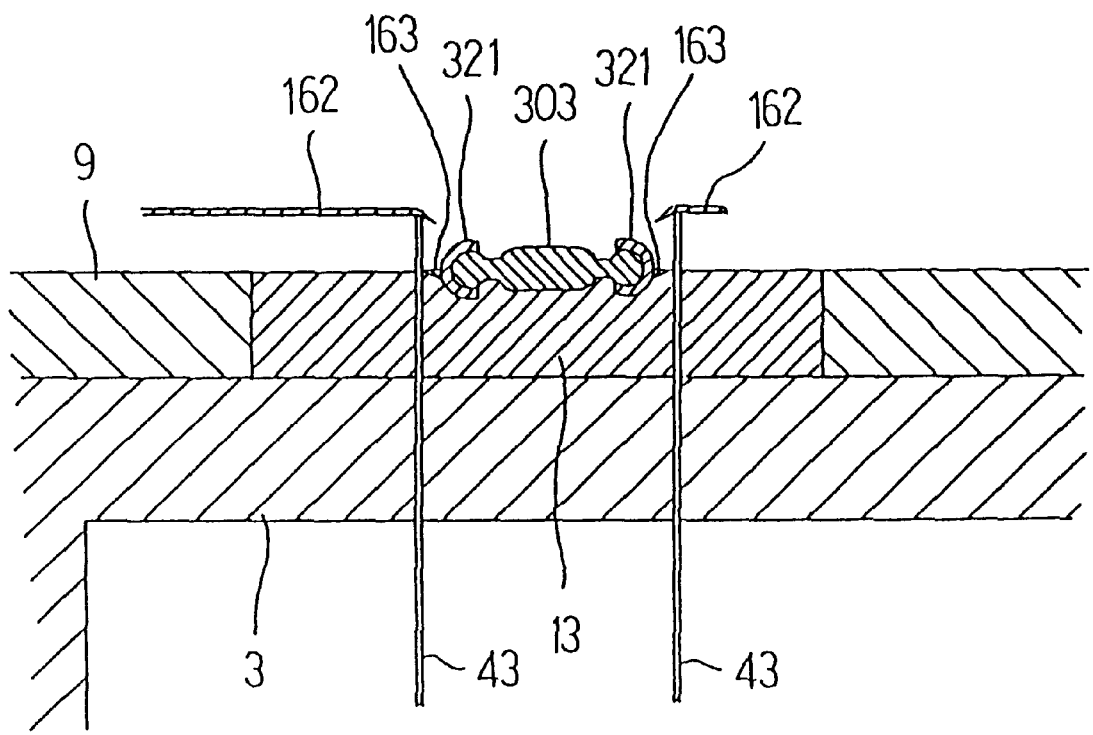
FIG. 17 is a sectional view of part of the secondary mold illustrating an operation thereof.

If the injection molding machine W is driven again to separate the movable mold device 3 from the stationary mold device 61, as shown in FIG. 3, the secondary product 320 stays on the movable mold device 3. The drive shafts 47 of the hydraulic cylinders 45 are actuated to move the second base 41 and the plurality of ejector pins 43 forward to eject the runners 162, 166 and 168 (see FIGS. 7 and 17). The runners 162 which are connected to the upper arm, upper leg and skull portions 321, 327 and 333 of the secondary product 320 at the tunnel gates 163 are separated therefrom at the tunnel gates 163 when they are ejected, as shown in FIG. 17.

Figure 18:
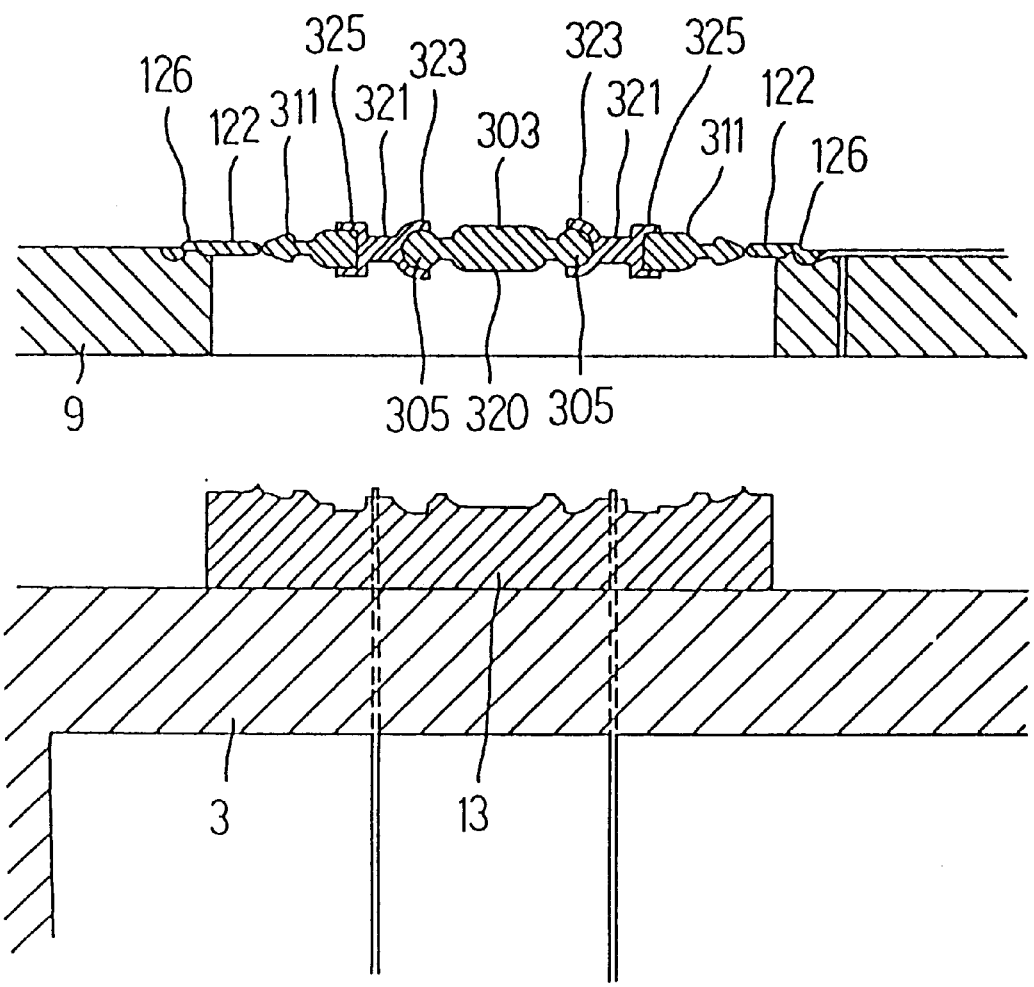
FIG. 18 is a sectional view of part of the secondary mold illustrating an operation thereof.

The drive shafts 47 of the hydraulic cylinders 45 are actuated again to move back the second base 41 to its original position and the ejector pins 43, and the first base 35 is moved forward, as shown in FIG. 4. As a result, the rotary table 9 is moved forward by the rotary shaft 7 and the pusher shafts 39. The secondary product 320 is separated from the second movable mold portion 13, since it is joined by the runners 122 to the runners 126 adhering to the rotary table 9, as shown in FIG. 18.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 is placed in the third movable mold recess 171 of the third movable mold portion 15, and the tertiary product 340 is placed in the fourth movable mold recess 221 of the fourth movable mold portion 17.

The injection molding machine W is driven again to join the movable mold device 3 with the stationary mold device 61, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

As a result, the secondary product 320 is placed in the tertiary mold cavity 173 of the tertiary mold 85, while the runners 122 are held in the runner channels 193 of the third stationary mold portion 69. The runner fixing channels 193 have circular recesses 195 formed in their portions corresponding to the connecting ends 132 at which the secondary product 320 is connected to the runners 122, as shown at FIG. 21(a), while the third movable mold portion 15 has pressing protrusions 197 formed on its front surface for pressing the connecting ends 132.

When the third movable mold portion 15 is joined with the third stationary mold portion 69, therefore, the pressing protrusions 197 cut the connecting ends 132 by forcing them into the recesses 195, and the secondary product 320 is, therefore, separated from the runners 122 when it is placed in the tertiary mold cavity 173.

Figure 19:
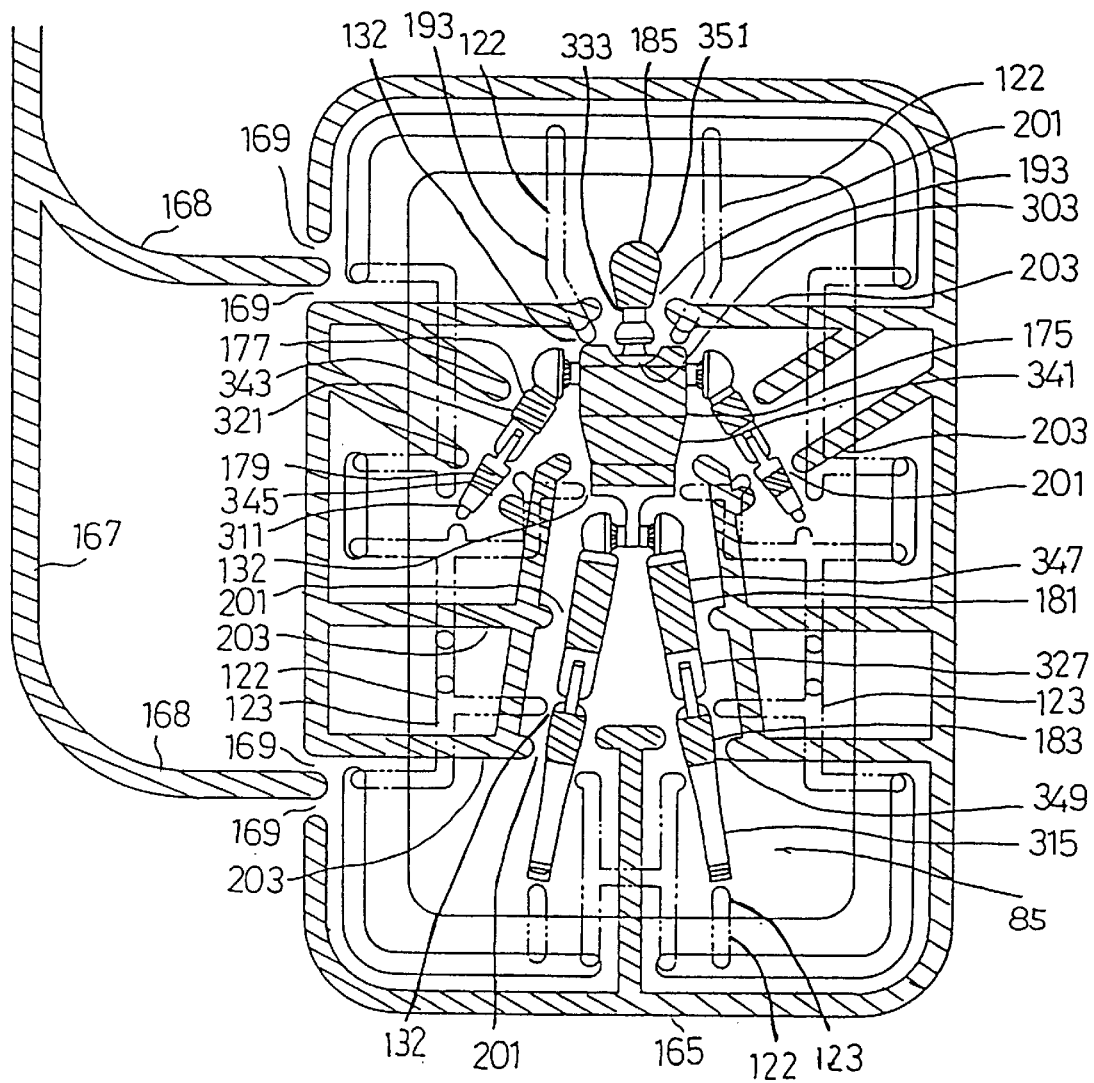
FIG. 19 is a plan view showing the flow of a synthetic resin material in the tertiary mold.

The third synthetic resin material C having a melting point lower than that of the second synthetic resin material B is injected from the injection unit, not shown, of the injection molding machine W into the trunk, upper arm, lower arm, upper leg, lower leg and skull flesh cavities 175, 177, 179, 181, 183 and 185 of the tertiary mold cavity 173 through the runner channels 167, tunnel gates 169, runner channels 165 and 203, and gates 201, as shown in FIG. 19.

Figure 23:
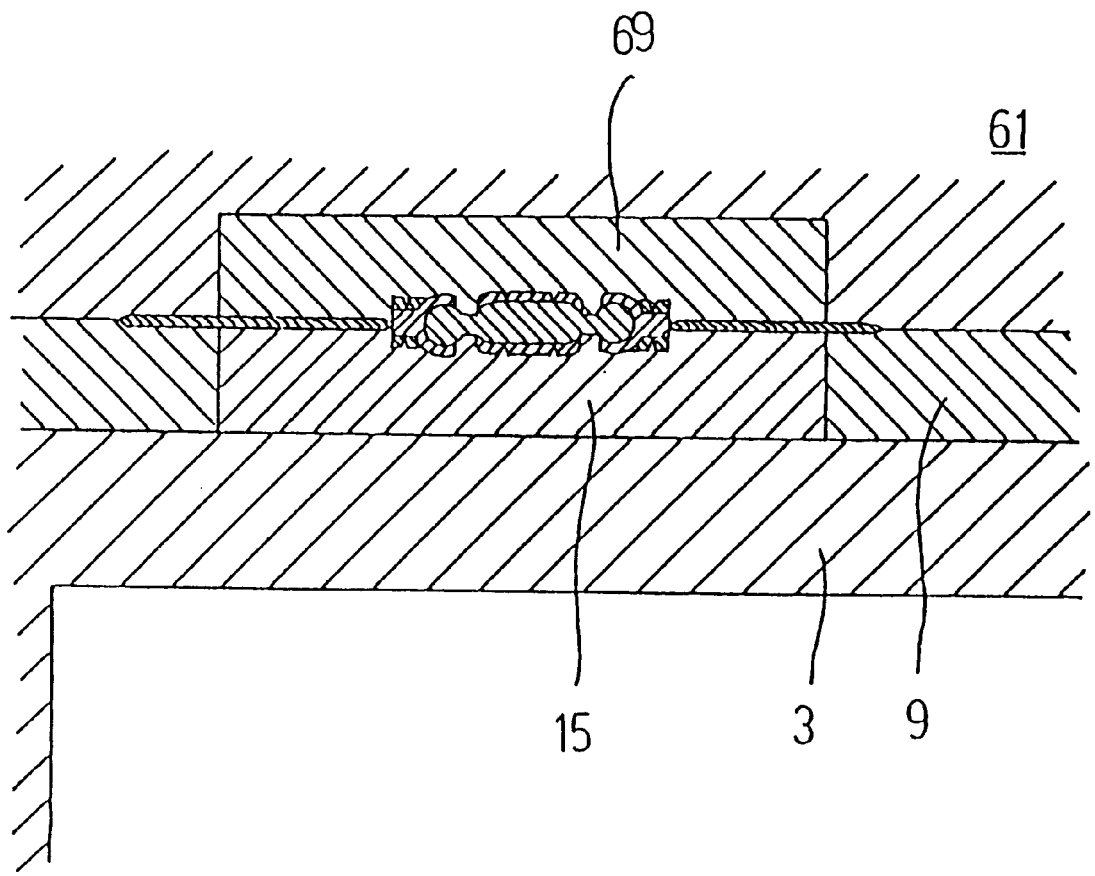
FIG. 23 is a sectional view of part of the tertiary mold.

As a result, the trunk, upper arm, lower arm, upper leg, lower leg and skull flesh portions 341, 343, 345, 347, 349 and 351 of the tertiary product 340 are molded in the corresponding flesh cavities 175, 177, 179, 181, 183 and 185 of the tertiary mold cavity 173, while the runners 168 are molded in the runner channels 167, the runners 166 are molded in the runner channels 165, the runners 223 are molded in the runner channels 203, and the connecting ends 239 of the runners 223 are molded in the gates 201, as shown in FIGS. 20 and 23.

Figure 21B:
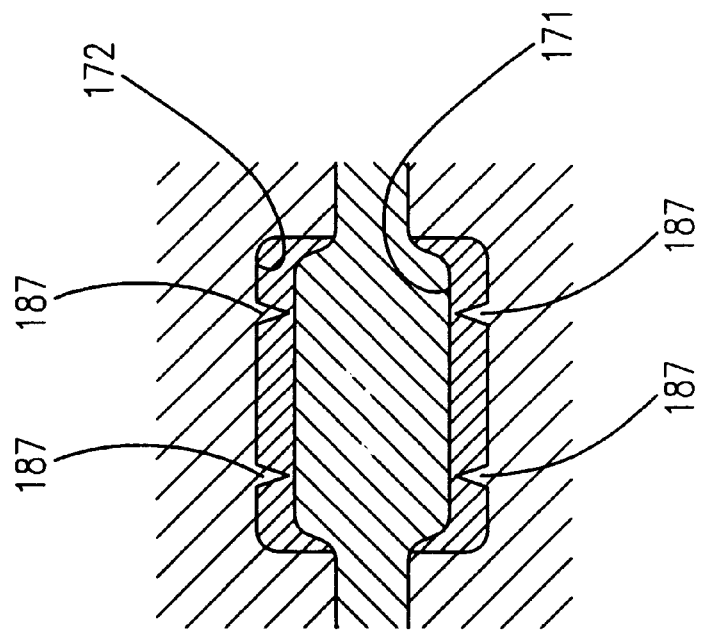
FIG. 21 is an enlarged sectional view of part of the tertiary mold.
Figure 21A:
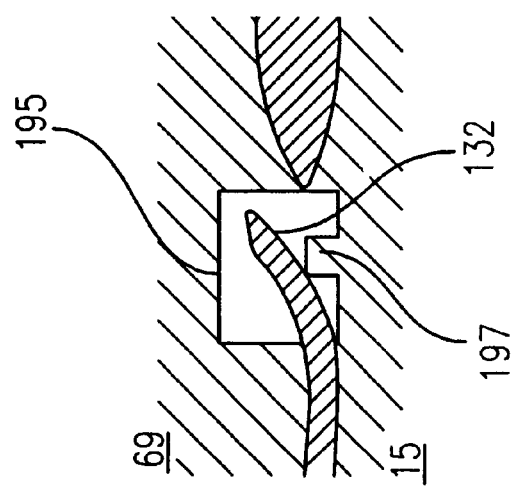

Each flesh portion 341, 343, 345, 347, 349 and 351 of the tertiary product 340 have the holes 191 formed by the protrusions 187 extending into each corresponding cavity 175, 177, 179, 181, 183 and 185 of the tertiary mold cavity 173, as shown in FIG. 21(b).

Figure 22:
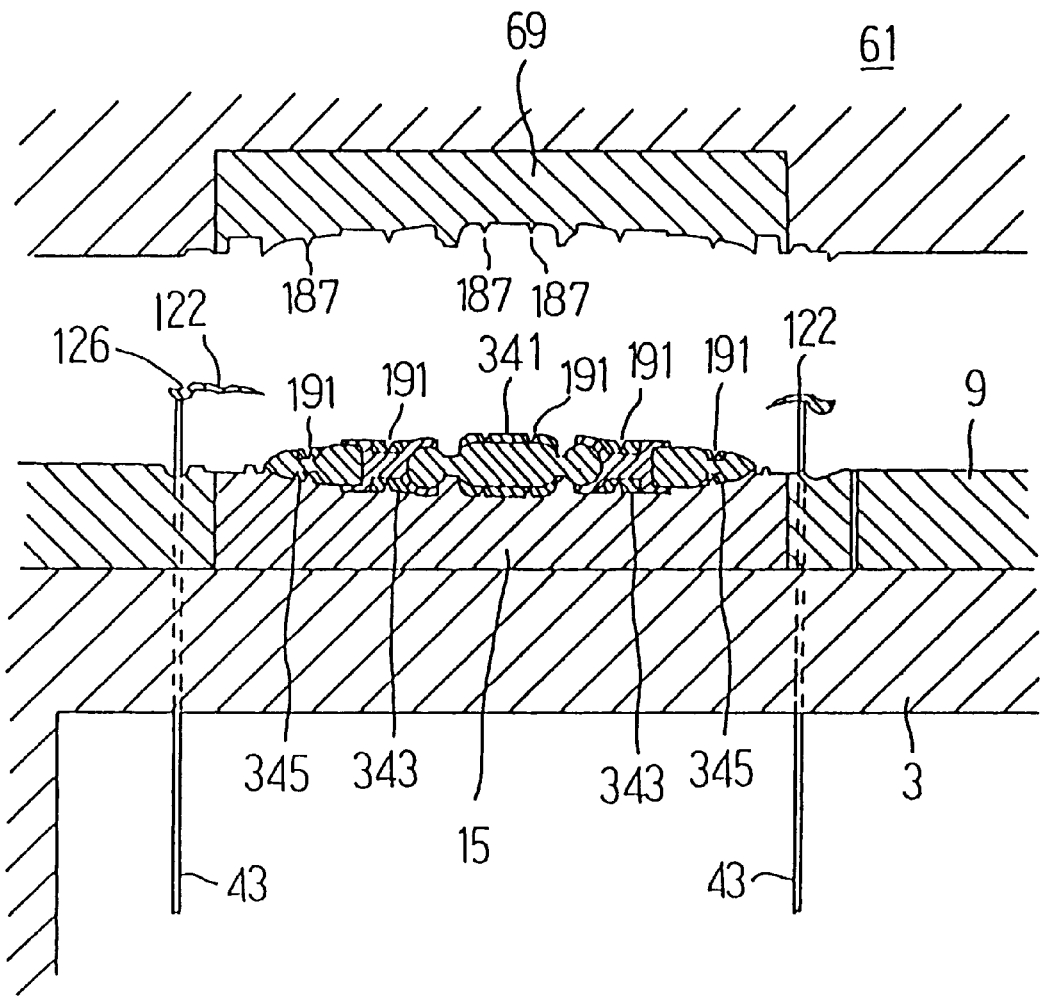
FIG. 22 is a sectional view of part of the tertiary mold illustrating an operation thereof.

The tertiary product 340 is, thus, molded as a body having "flesh" added to the secondary product 320 in the tertiary mold 85. Another primary product 300, another secondary product 320 and another quaternary product 360 are simultaneously molded in the primary, secondary and quaternary molds 81, 83 and 87, respectively. When the injection molding machine W is driven to separate the movable mold device 3 from the stationary mold device 61 as shown in FIG. 3, the tertiary product 340 stays stuck on the movable mold device 3. On actuating the drive shafts 47 of the hydraulic cylinders 45 to move the second base 41 forward, a plurality of the ejector pins 43 . . . protrude forward. The runners 168, 122 and 126 are ejected by a part of a plurality of the ejector pins 43 . . ., as shown in FIG. 8. Since the runners 122 have already been cut off from the tertiary product 340 by the protrusions 197, as described above, only the runners 122 and 126 can be ejected as shown in FIG. 22.

Figure 24:
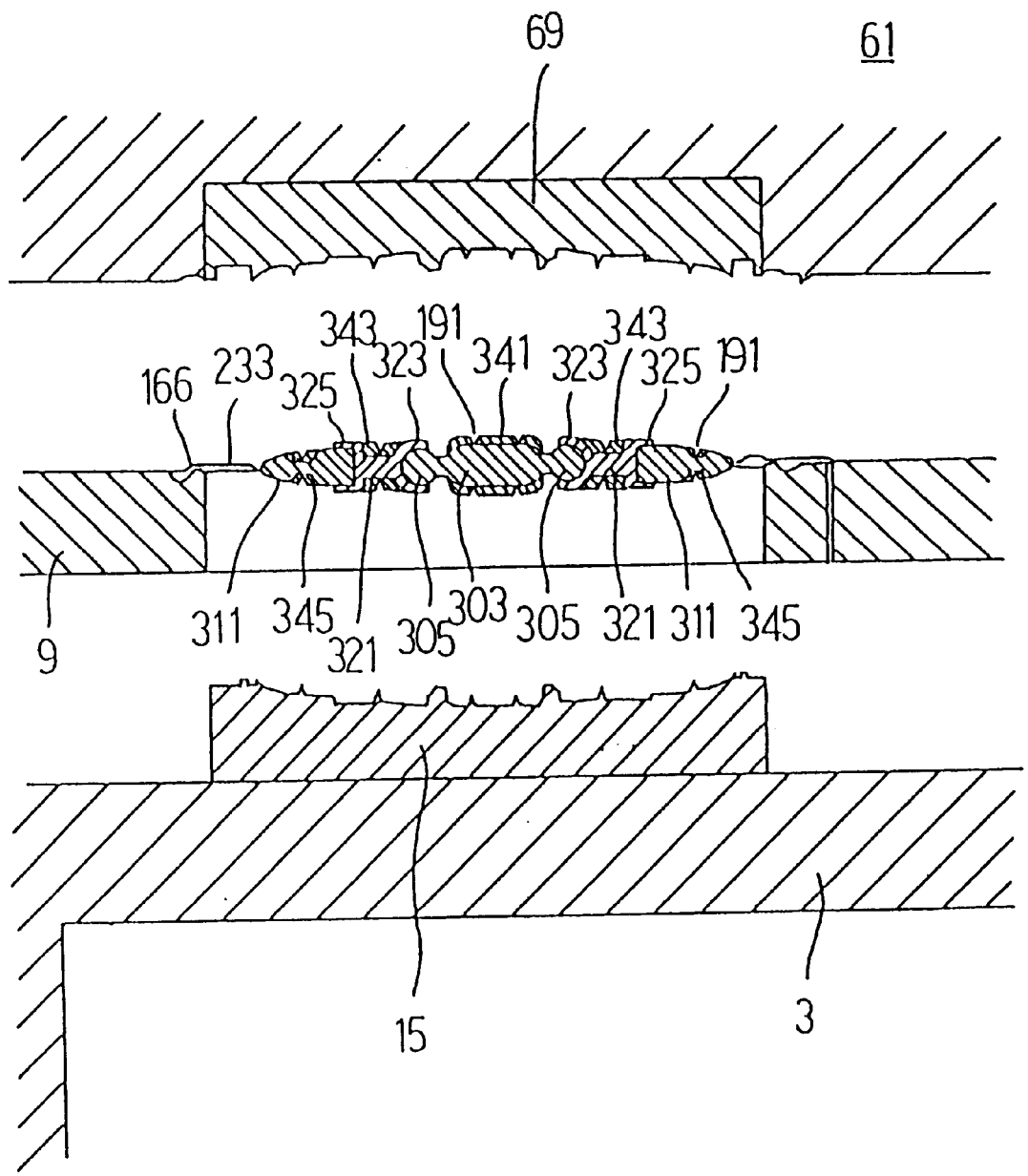
FIG. 24 is a sectional view of part of the tertiary mold illustrating an operation thereof.

The drive shafts 47 of the hydraulic cylinders 45 are, then, actuated to move back the second base 41 to its original position and the ejector pins 43, and the first base 35 is moved forward, as shown in FIG. 4. As a result, the rotary table 9 is moved forward by the rotary shaft 7 and the pusher shafts 39 and the tertiary product 340 is separated from the movable mold device 3, or the third movable mold portion 15, since it is connected by the runners 233 to the runners 166 adhering to the rotary table 9, as shown in FIGS. 8 and 24.

The hydraulic cylinder not shown is actuated to move the rack 59 to rotate the spur gear 57 and the rotary shaft 7 to rotate the rotary table 9 by an angle of 90 degrees, and the first base 35 is moved back to its original position, whereupon the primary product 300 is placed in the second movable mold recess 133 of the second movable mold portion 13, the secondary product 320 in the third movable mold recess 171 of the third movable mold portion 15, and the tertiary product 340 in the fourth movable mold recess 221 of the fourth movable mold portion 17.

The injection molding machine W is driven to join the movable mold device 3 with the stationary mold device 61 again, as shown in FIG. 2. The first movable mold portion 11 is joined with the first stationary mold portion 65 to form the primary mold 81 and the second movable mold portion 13 is joined with the second stationary mold portion 67 to form the secondary mold 83. Moreover, the third movable mold portion 15 is joined with the third stationary mold portion 69 to form the tertiary mold 85 and the fourth movable mold portion 17 is joined with the fourth stationary mold portion 71 to form the quaternary mold 87.

As a result, the tertiary product 340 is placed in the quaternary mold cavity 225 of the quaternary mold 87, while the runners 233 are held in the runner channels 235 of the fourth movable mold portion 17. The quaternary mold cavity 225 is provided with a plurality of engaging protrusions 227 which engage in the engaging holes 191 of the tertiary product 340, as shown in FIG. 26. The runner channels 235 have recesses 237 formed in their portions corresponding to the connecting ends 239 at which the tertiary product 340 is connected to the runners 233, as shown in FIG. 27, while the fourth stationary mold portion 71 has pressing protrusions 241 formed on its front surface for pressing the connecting ends 239.

When the fourth movable mold portion 17 is joined with the fourth stationary mold portion 71, therefore, the pressing protrusions 241 cut the connecting ends 239 by forcing them into the recesses 237, and the tertiary product 340 is, therefore, separated from the runners 233 when it is placed in the quaternary mold cavity 225.

Figure 25:
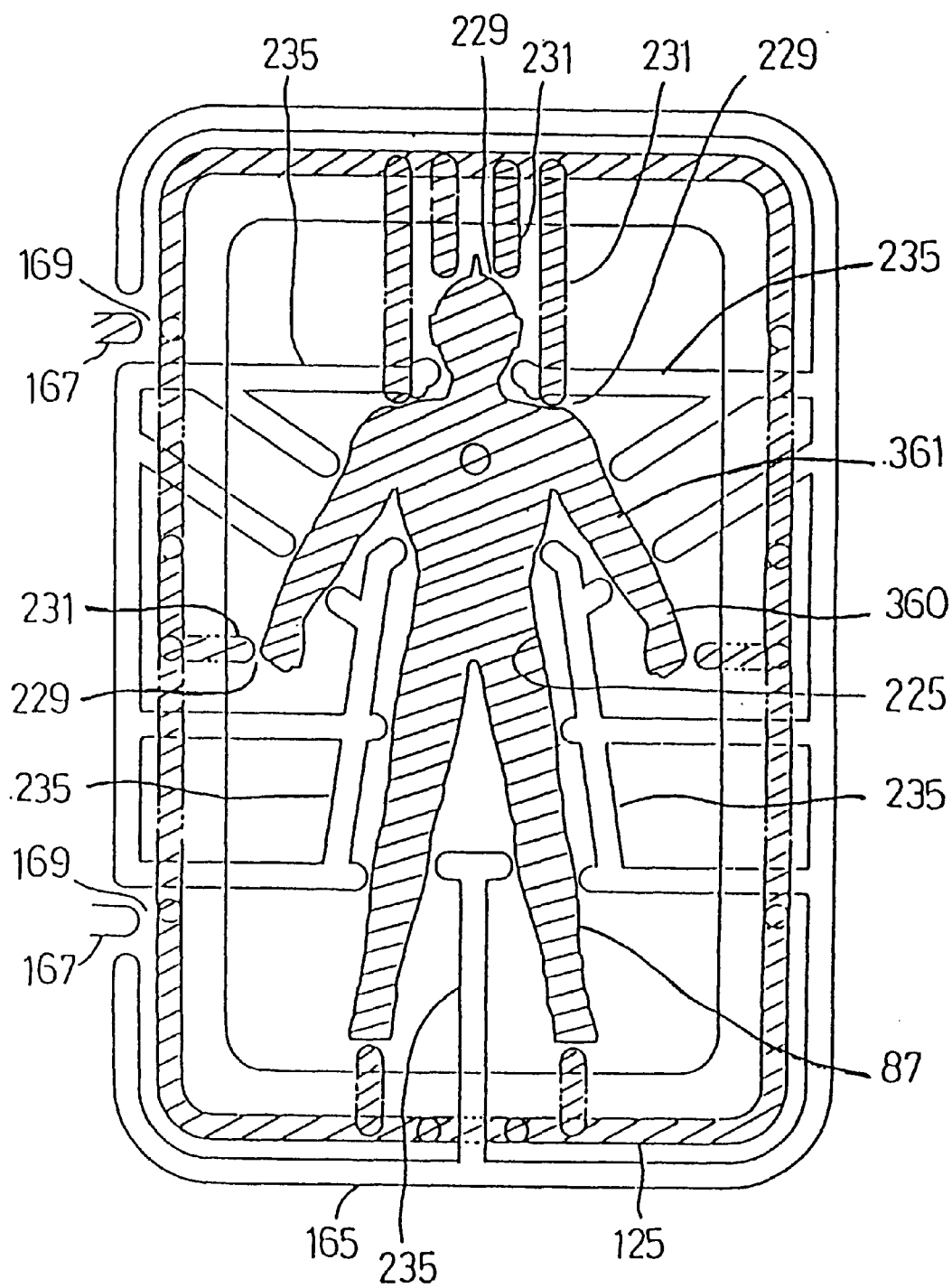
FIG. 25 is a plan view showing the flow of a synthetic resin material in the quaternary mold.

The fourth synthetic resin material D having a melting point lower than that of the third synthetic resin material C is injected from the injection unit, not shown, of the injection molding machine W into the quaternary mold cavity 225 through the runner channels 167, tunnel gates 169, runner channels 125 and 231, and gates 229, as shown in FIG. 25.

Soft vinyl chloride is, for example, used as the fourth synthetic resin material D to make the quaternary product 360 within which the tertiary product 340 is movable. Although this material is so viscous as to otherwise cause the displacement of the tertiary product 340 from its proper position as an insert, the protrusions 227 engaging in its holes 191, as shown in FIG. 26, firmly hold the tertiary product 340 against any such displacement in the quaternary mold 87.

As a result, the covering 361 enclosing the tertiary product 340 is molded as the quaternary product 360 in the quaternary mold cavity 225, while the runners 168 are molded in the runner channels 167, the runners 126 are molded in the runner channels 125, and the runners 233 are molded in the runner channels 231.

While the quaternary product 360 is molded in the quaternary mold 87, another primary product 300, another secondary product 320 and another tertiary product 340 are simultaneously molded in the primary, secondary and tertiary molds 81, 83 and 85, respectively.

Figure 28:
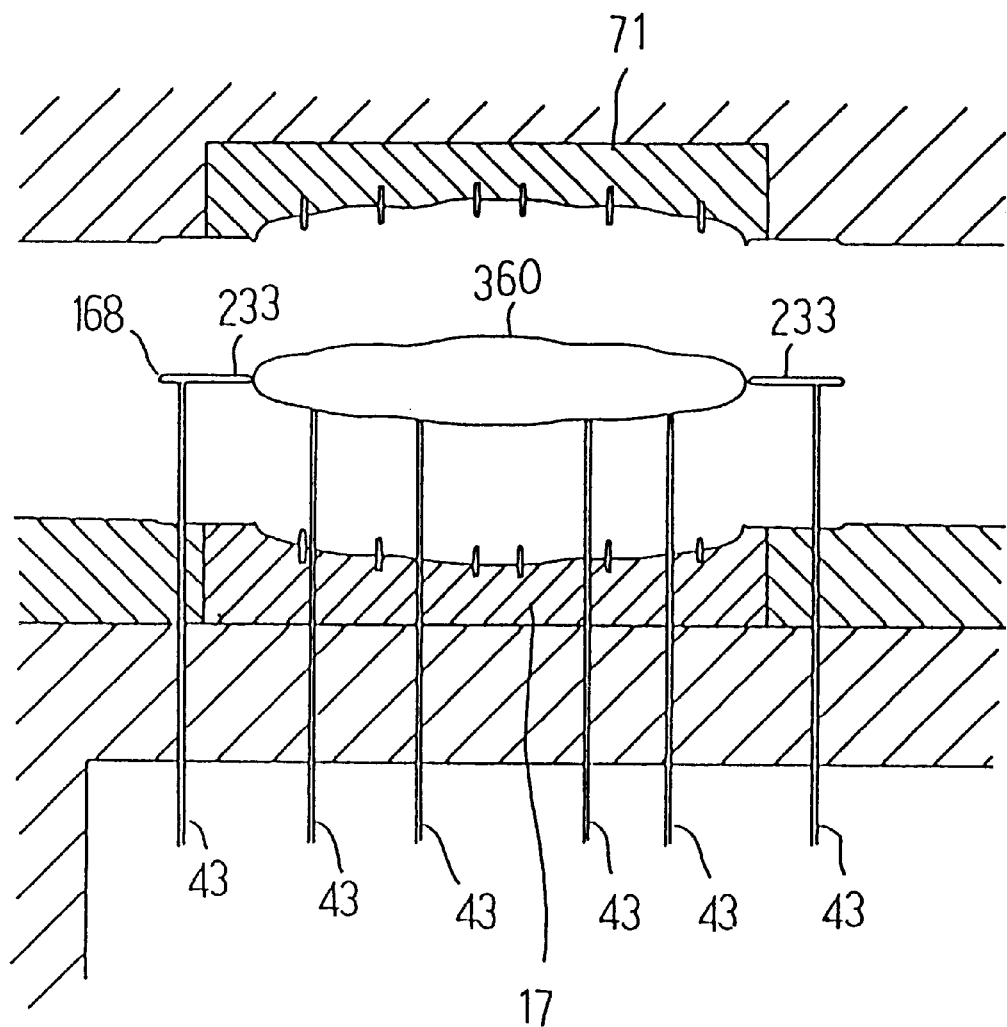
FIG. 28 is a sectional view of part of the quaternary mold illustrating an operation thereof.
Figure 29:
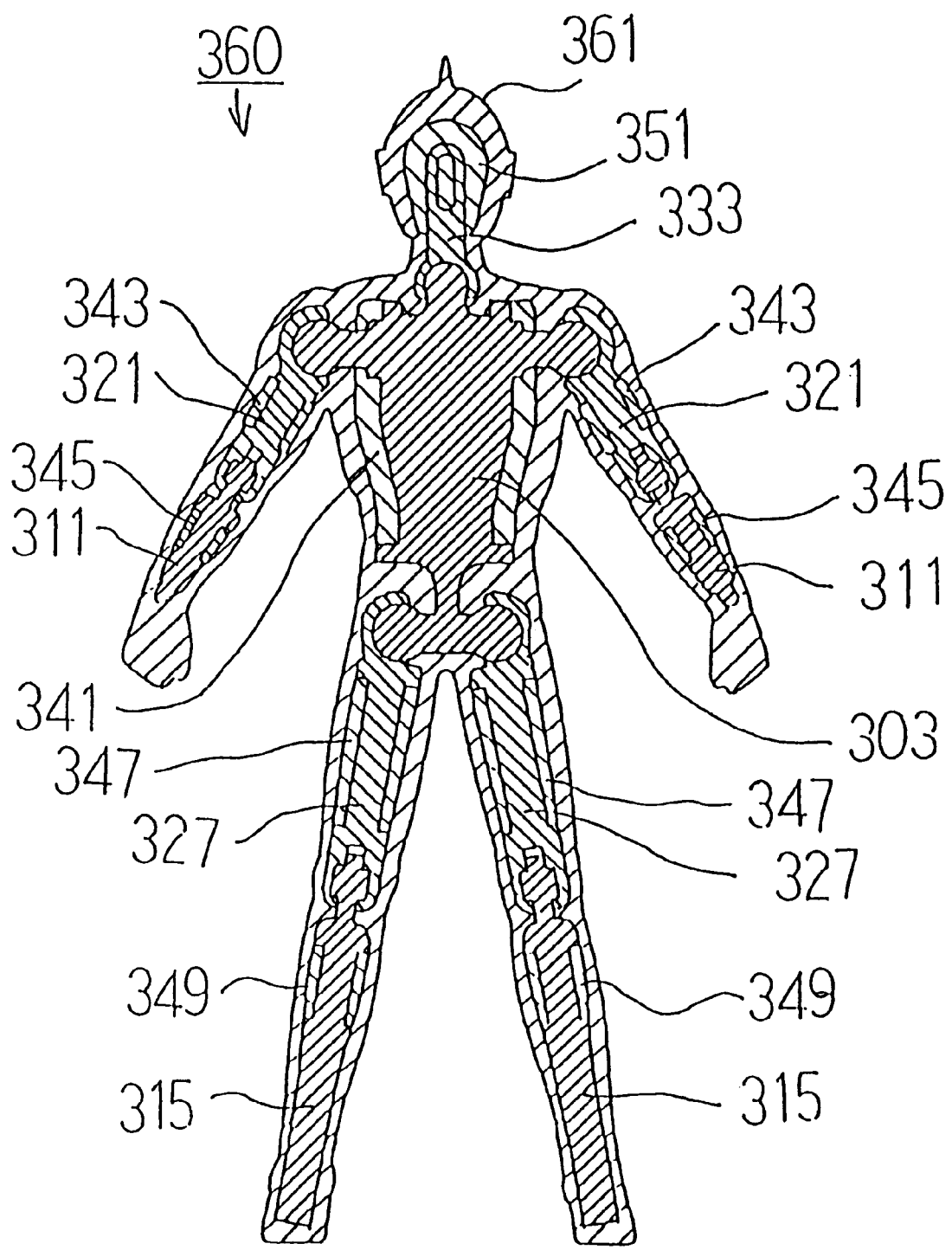
FIG. 29 is a sectional view of a quaternary product.

When the injection molding machine W is driven to separate the movable mold device 3 from the stationary mold device 61 as shown in FIG. 3, the quaternary product 360 still stays stuck on the movable mold device 3. On actuating the drive shafts 47 of the hydraulic cylinders 45 to move the second base 41 forward, a plurality of the ejector pins 43 . . . protrude forward. The runners 166, 223, 168, 126 and 233, and the quaternary product 360 are ejected by a part of a plurality of the ejector pins 43. . . . , as shown in FIGS. 9 and 28. Since the runners 166 and 223 have already been cut off by the protrusions 241 from the quarterly product 360 as described before, the quaternary product 360 can be taken out with the runners 168 and 233 being still connected.

The quaternary product 360 or the final product can be taken out by separating it from the runners 233. The quaternary product 360 has the shoulder shells 323 of the upper arm portions 321 being connected to the spherical shoulder joints 305 of the trunk portion 303 with the shoulder shells 323 enclosing and holding the spherical shoulder joints 305, and the outer surfaces of the spherical shoulder joints 305 and the inner surfaces of the shoulder shells 323 are formed to be substantially polygonal, then the upper arm portions 321 can be moved by a click motion in both the vertical and horizontal directions by making the outer surfaces of the spherical shoulder joints 305 or the inner surfaces of the shoulder shells 323 flex.

Similarly, the quaternary product 360 has the crotch shells 329 of the upper leg portions 327 being connected to the spherical crotch joints 307 of the trunk portion 303 with the crotch shells 329 enclosing and holding the spherical crotch joints 307, and the outer surfaces of the spherical crotch joints 307 and the inner surfaces of the crotch shells 329 are formed to be substantially polygonal, then the upper leg portions 327 can be moved by a click motion in both the vertical and horizontal directions by making the outer surfaces of the spherical crotch joints 307 or the inner surfaces of the crotch shells 329 flex.

The quaternary product 360 has the elbow bearings 325 of the upper arm portions 321 being connected to the protruding shafts 313 of the lower arm portion 311 with the elbow bearings 325 enclosing and holding the protruding shafts 313, and the outer surfaces of the protruding shafts 313 and the inner surfaces of the elbow bearings 325 are formed to be substantially polygonal, then the lower arm portion 311 can be moved by a click motion in the vertical direction by making the outer surfaces of the protruding shafts 313 or the inner surfaces of the elbow bearings 325 flex.

The quaternary product 360 has the knee bearings 331 of the upper leg portions 327 being connected to the protruding shafts 317 of the lower leg portion 315 with the knee bearings 331 enclosing and holding the protruding shafts 317, and the outer surfaces of the protruding shafts 317 and the inner surfaces of the knee bearings 331 are formed to be substantially polygonal, then the lower leg portion 315 can be moved by a click motion in the vertical direction by making the outer surfaces of the protruding shafts 317 or the inner surfaces of the knee bearings 331 flex.

The quaternary product 360 has the trunk portion 303, the upper arm portions 321, the lower arm portion 311, the upper leg portions 327 and the lower leg portion 315 each being covered with a covering 361 whose material has a restoring force that forces each of the above parts to return to its original position when moved. However, the click motion enables each of them to stay in its moved position.

According to the molding apparatus and process of this invention, the primary product having holes formed on its surface is molded in the primary mold, and the protrusions formed by the secondary mold and extending into the secondary mold cavity are engaged in the holes of the primary product to secure it in the secondary mold cavity. Therefore, the primary product is held in the secondary mold cavity so securely as not to undergo any displacement from its proper position when a synthetic resin material is injected into the secondary mold cavity. Thus, this invention ensures the manufacture of molded products which are always uniform in quality.

As the molded product of this invention is made while being held by the protrusions in the secondary mold cavity, the primary product forming the interior structure of the product does not have any portion projecting from the secondary product forming the exterior structure. Thus, the secondary product is made to be acceptable as a final product without requiring any substantially extra work, such as cutting.

Thus, it is seen that a game apparatus is provided. One skilled in the art will appreciate that the present invention can be practiced by other than the preferred embodiments which are presented for purpose of illustration, and not of limitation, and the present invention is limited only by the claims which follow.

What is claimed is:

1. A molding process comprising:
   (a) a first molding step of molding a primary product by injecting a first synthetic resin material into a primary mold cavity of a primary mold, said primary mold cavity having inwardly projecting protrusions so that said primary product has holes formed on the surface thereof;

(b) a second molding step of securing said primary product in a secondary mold cavity of a secondary mold by engaging protrusions inwardly projecting in said secondary mold cavity into said holes of said primary product molded in said first molding step; and (c) said second molding step includes a step of molding a secondary product having through holes on its surface, said holes being made by said protrusions inwardly projecting in said secondary mold cavity, by injecting a second synthetic resin material into said secondary mold cavity, while said primary product is secured therein.

* * * * *